US00RE47243E

(19) United States
(12) Reissued Patent
Alshina et al.

(10) Patent Number: US RE47,243 E
(45) Date of Reissued Patent: *Feb. 12, 2019

(54) METHOD AND APPARATUS FOR ENCODING VIDEO, AND METHOD AND APPARATUS FOR DECODING VIDEO

(71) Applicant: SAMSUNG ELECTRONICS CO., LTD., Suwon-si (KR)

(72) Inventors: Elena Alshina, Suwon-si (KR); Alexander Alshin, Suwon-si (KR); Vadim Seregin, Suwon-si (KR); Nikolay Shlyakhov, Suwon-si (KR)

(73) Assignee: SAMSUNG ELECTRONICS CO., LTD., Suwon-si (KR)

( * ) Notice: This patent is subject to a terminal disclaimer.

(21) Appl. No.: 14/926,883

(22) Filed: Oct. 29, 2015

Related U.S. Patent Documents

Reissue of:
(64) Patent No.: 8,548,052
Issued: Oct. 1, 2013
Appl. No.: 12/964,688
Filed: Dec. 9, 2010

U.S. Applications:
(63) Continuation of application No. 14/849,073, filed on Sep. 9, 2015, which is an application for the reissue of Pat. No. 8,548,052.

(30) Foreign Application Priority Data

Dec. 9, 2009 (KR) ..... 10-2009-0121935

(51) Int. Cl.
*H04N 7/12* (2006.01)
*H04N 19/85* (2014.01)
(Continued)

(52) U.S. Cl.
CPC ..... *H04N 19/85* (2014.11); *H04N 19/105* (2014.11); *H04N 19/11* (2014.11); *H04N 19/119* (2014.11);
(Continued)

(58) Field of Classification Search
CPC .. H04N 19/105; H04N 19/176; H04N 19/119; H04N 19/46; H04N 19/85;
(Continued)

(56) References Cited

U.S. PATENT DOCUMENTS 8,873,633 B2 10/2014 Lee et al.
2005/0053145 A1* 3/2005 Hsu et al. ..... 375/240.16
(Continued)

FOREIGN PATENT DOCUMENTS

CN 101502119 A 8/2009
CN 101569201 A 10/2009
(Continued)

OTHER PUBLICATIONS

English-language machien translation of KR 10-2009-0121935.*
(Continued)

*Primary Examiner* — Christina Y Leung
(74) *Attorney, Agent, or Firm* — Sughrue Mion, PLLC

(57) ABSTRACT

Disclosed are a video encoding method and apparatus and a video decoding method and apparatus. The method of encoding video includes: producing a first predicted coding unit of a current coding unit, which is to be encoded; determining whether the current coding unit comprises a portion located outside a boundary of a current picture; and producing a second predicted coding unit is produced by changing a value of pixels of the first predicted coding unit by using the pixels of the first predicted coding unit and neighboring pixels of the pixels when the current coding unit does not include a portion located outside a boundary of the current picture. Accordingly, a residual block that is the difference between the current encoding unit and the second predicted encoding unit, can be encoded, thereby improving video prediction efficiency.

1 Claim, 27 Drawing Sheets

(51) Int. Cl.

| | |
|---|---|
| ***H04N 19/176*** | (2014.01) |
| ***H04N 19/119*** | (2014.01) |
| ***H04N 19/46*** | (2014.01) |
| ***H04N 19/122*** | (2014.01) |
| ***H04N 19/61*** | (2014.01) |
| ***H04N 19/11*** | (2014.01) |
| ***H04N 19/105*** | (2014.01) |
| ***H04N 19/134*** | (2014.01) |

(52) U.S. Cl.
CPC ..... *H04N 19/122* (2014.11); *H04N 19/134* (2014.11); *H04N 19/176* (2014.11); *H04N 19/46* (2014.11); *H04N 19/61* (2014.11)

(58) Field of Classification Search
CPC ..... H04N 19/122; H04N 19/61; H04N 19/11; H04N 19/134
USPC ..... 375/240.13
See application file for complete search history.

(56) References Cited

U.S. PATENT DOCUMENTS

| | | | | |
|---|---|---|---|---|
| 2005/0190976 | A1* | 9/2005 | Todoroki et al. | 382/236 |
| 2006/0023791 | A1 | 2/2006 | Yoo et al. | |
| 2006/0120450 | A1* | 6/2006 | Han | H04N 19/176 375/240.03 |
| 2006/0233251 | A1* | 10/2006 | Kim | H04N 19/139 375/240.12 |
| 2007/0253483 | A1 | 11/2007 | Lee et al. | |
| 2008/0107175 | A1 | 5/2008 | Han et al. | |
| 2008/0240248 | A1 | 10/2008 | Lee et al. | |
| 2009/0074073 | A1* | 3/2009 | Srinivasan et al. | 375/240.16 |
| 2009/0135909 | A1 | 5/2009 | Chen et al. | |
| 2011/0038414 | A1* | 2/2011 | Song | H04N 19/105 375/240.12 |
| 2011/0038415 | A1* | 2/2011 | Min | H04N 19/00763 375/240.12 |
| 2011/0090969 | A1* | 4/2011 | Sung et al. | 375/240.25 |
| 2012/0014438 | A1* | 1/2012 | Segall et al. | 375/240.12 |
| 2012/0177106 | A1 | 7/2012 | Divorra Escoda et al. | |

FOREIGN PATENT DOCUMENTS

| | | | |
|---|---|---|---|
| EP | 1641280 | A3 | 3/2006 |
| EP | 1841230 | A1 | 10/2007 |
| EP | 2001239 | B1 | 9/2017 |
| KR | 10-2008-0088042 | A | 10/2008 |
| KR | 1020110044486 | A | 4/2011 |
| WO | 2008117933 | A1 | 10/2008 |
| WO | 2009051419 | A2 | 4/2009 |
| WO | 2009051719 | A2 | 4/2009 |
| WO | 2010002214 | A2 | 1/2010 |

OTHER PUBLICATIONS

Wiegand T et al: "Overview of the H.264/AVC video coding standard", IEEE Transactions on Circuits and Systems for Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI: 10.1109/TCSVT.2003.815165.

Vernazza et al: "A new splitting strategy for adaptive transform coding", Signal Processing, Elsevier Science Publishers B.V. Amsterdam, NL, vol. 34, No. 3, Dec. 1, 1993 (Dec. 1, 1993), pp. 335-340, XP026706750, ISSN: 0165-1684, DOI: 10.1016/0165-1684(93)90140-6.

Communication from the European Patent Office dated Jul. 31, 2013 in counterpart European Application No. 10836223.7.

International Search Report dated Jul. 28, 2011 in International Application No. PCT/KR2010/008822.

Communication from the Chinese Patent Office dated Aug. 10, 2015 in a counterpart Chinese Patent Application No. 201080063360.6.

Ken McCann et al., "Samsung's Response to the Call for Proposals on Video Compression Technology", Joint Collaborative Team on Video Coding (JCT-Vc) of ITU-T SG16 WP3 and ISO/IEC JTC1/SC29/WG11, 1st Meeting: Dresden, DE, Apr, 15-23, 2010, Source: Samsung Electronics Co., Ltd. and British Broadcasting Corporation, Total 42 pages (cited as "Video coding technology proposal by Samsung (and BBC)" in Cite Nos. 4-10).

Communication dated Dec. 14, 2015, issued by the European Patent Office in counterpart European Application No. 15174986.8.

Communication dated Nov. 20, 2015, issued by the European Patent Office in counterpart European Application No. 15174988.4.

Communication dated Dec. 10, 2015, issued by the European Patent Office in counterpart European Application No. 15174988.4.

Communication dated Nov. 20, 2015, issued by the European Patent Office in counterpart European Application No. 15174991.8.

Communication dated Dec. 8, 2015, issued by the European Patent Office in counterpart European Application No. 15174991.8.

Communication dated Nov. 20, 2015, issued by the European Patent Office in counterpart European Application No. 15174992.6.

Communication dated Dec. 8, 2015, issued by the European Patent Office in counterpart European Application No. 15174992.6.

Jaeil Kim et al., "Enlarging MB size for high fidelity video coding beyond HD", ITU—Telecommunications Standardization Sector Study Group 16 Question 6 Video Coding Experts Group (VCEG), 36$^{th}$ Meeting: San Diego, USA, Oct. 8-10, 2008, Document: VCEG-AJ21, Filename: VCEG-AJ21.doc (6 Pages Total).

Communication dated Apr. 21, 2016, issued by the Korean Intellectual Property Office in corresponding Korean Application No. 10-2009-0121935.

Communication dated Apr. 21, 2016, issued by the Korean Intellectual Property Office in corresponding Korean Application No. 10-2015-0105295.

Communication dated Apr. 21, 2016, issued by the Korean Intellectual Property Office in corresponding Korean Application No. 10-2015-0105296.

Communication dated Apr. 21, 2016, issued by the Korean Intellectual Property Office in corresponding Korean Application No. . 10-2015-0105298.

Communication dated Jun. 28, 2016, issued by the Korean Intellectual Property Office in corresponding Korean Application No. 10-2015-0105297.

Communication dated Aug. 2, 2017, from the State Intellectual Property Office of People's Republic of China in counterpart Application No. 201510388369.9.

Communication dated Aug. 28, 2017, from the State Intellectual Property Office of People's Republic of China in counterpart Application No. 201510388593.8.

Communication dated Sep. 5, 2017, from the State Intellectual Property Office of People's Republic of China in counterpart Application No. 201510387296.1.

Communication dated Jun. 5, 2018, from the State Intellectual Property Office of People's Republic of China in counterpart Application No. 201510387983.3.

* cited by examiner

CODING UNITS (1010)

| | NUMBER OF PREDICTION MODES | | |
|---|---|---|---|
| SIZE OF CODING UNIT | EXAMPLE 1 | EXAMPLE 2 | EXAMPLE 3 |
| 2 | – | 5 | 5 |
| 4 | 9 | 9 | 9 |
| 8 | 9 | 9 | 9 |
| 16 | 33 | 17 | 11 |
| 32 | 33 | 33 | 33 |
| 64 | 5 | 5 | 9 |
| 128 | 5 | 5 | 5 |

| PREDICTION MODE | NAME |
|---|---|
| 0 | VERTICAL |
| 1 | HORIZONTAL |
| 2 | DC |
| 3 | DOWN_LEFT |
| 4 | DOWN_RIGHT |
| 5 | VERTICAL_RIGHT |
| 6 | HORIZONTAL_DOWN |
| 7 | VERTICAL_LEFT |
| 8 | HORIZONTAL_UP |

METHOD AND APPARATUS FOR ENCODING VIDEO, AND METHOD AND APPARATUS FOR DECODING VIDEO

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a continuation reissue application of U.S. application Ser. No. 14/849,073, which was filed on Sep. 9, 2015, which is a reissue application of U.S. Pat. No. 8,548,052, which was filed as U.S. patent application Ser. No. 12/964,688 on Dec. 9, 2010 and issued on Oct. 1, 2013, and which is the subject of four other co-pending reissue applications: application Ser. No. 14/849,073; which was filed on Sep. 9, 2015; application Ser. No. 14/926,968, which was filed on Oct. 29, 2015; application Ser. No. 14/927,025, which was filed on Oct. 29, 2015; and application Ser. No. 14/927,026 which was filed on Oct. 29, 2015. U.S. Pat. No. 8,548,052 claims priority from Korean Patent Application No. 10-2009-0121935, filed on Dec. 9, 2009 in the Korean Intellectual Property Office, the disclosure of which is incorporated herein by reference in its entirety.*

CROSS-REFERENCE TO RELATED PATENT APPLICATION

This application claims priority from Korean Patent Application No. 10-2009-0121935, filed on Dec. 9, 2009 in the Korean Intellectual Property Office, the disclosure of which is incorporated herein in its entirety by reference.

BACKGROUND

1. Field

One or more exemplary embodiments relate to a video encoding method and apparatus and a video decoding method and apparatus that are capable of improving video compression efficiency by performing post-processing according to a location of predicted video data.

2. Description of the Related Art

In an image compression method, such as Moving Picture Experts Group (MPEG)-1, MPEG-2, MPEG-4, or H.264/MPEG-4 Advanced Video Coding (AVC), a picture is divided into macroblocks in order to encode an image. Each of the macroblocks is encoded in all encoding modes that can be used in inter prediction or intra prediction, and then is encoded in an encoding mode that is selected according to a bitrate used to encode the macroblock and a distortion degree of a decoded macroblock based on the original macroblock. As hardware for reproducing and storing high resolution or high quality video content is being developed and supplied, a need for a video codec for effectively encoding or decoding the high resolution or high quality video content is increasing. In a related art video codec, a video is encoded in units of macroblocks each having a predetermined size.

SUMMARY

One or more exemplary embodiments provide a video encoding method and apparatus and a video decoding method and apparatus for improving video compression efficiency by generating a new predicted block by changing a value of each pixel in a predicted block through post-processing according to a location of a predicted block in a picture.

According to an aspect of an exemplary embodiment, there is provided a method of encoding video, the method including: producing a first predicted coding unit of a current coding unit that is to be encoded; determining whether the current coding unit includes a portion located outside a boundary of a current picture; and producing a second predicted coding unit by changing a value of pixels of the first predicted coding unit by using the pixels of the first predicted coding unit and neighboring pixels of the pixels when the current coding unit does not include the portion located outside the boundary of the current picture, and skipping the producing the second predicted coding unit when the current coding unit includes a portion located outside a boundary of the current picture.

According to an aspect of another exemplary embodiment, there is provided an apparatus for encoding video, the apparatus including: a predictor which produces a first predicted coding unit of a current coding unit that is to be encoded; a determiner which determines whether the current coding unit includes a portion located outside a boundary of a current picture; and a post-processor which produces a second predicted coding unit by changing values of pixels of the first predicted coding unit by using the pixels of the first predicted coding unit and neighboring pixels of the pixels when the current coding unit does not include the portion located outside the boundary of the current picture, and skipping the producing the second predicted coding unit when the current coding unit includes the portion located outside the boundary of the current picture.

According to an aspect of another exemplary embodiment, there is provided a method of decoding video, the method including: extracting information regarding a prediction mode for a current decoding unit, which is to be decoded, from a received bitstream; producing a first predicted decoding unit of the current decoding unit, based on the extracted information; determining whether the current decoding unit includes a portion located outside a boundary of a current picture; and producing a second predicted decoding unit by changing values of pixels of the first predicted decoding unit by using the pixels of the first predicted decoding unit and neighboring pixels of the pixels when the current decoding unit does not include the portion located outside the boundary of the current picture, and skipping the producing the second predicted decoding unit when the current decoding unit includes the portion located outside the boundary of the current picture.

According to an aspect of another exemplary embodiment, there is provided an apparatus for decoding video, the apparatus including: an entropy decoder which extracts information regarding a prediction mode for a current decoding unit, which is to be decoded, from a received bitstream; a predictor which produces a first predicted decoding unit of the current decoding unit, based on the extracted information; a determiner which determines whether the current decoding unit includes a portion located outside a boundary of a current picture; and a post-processor which produces a second predicted decoding unit by changing a value of pixels of the first predicted decoding unit by using the pixels of the first predicted decoding unit and neighboring pixels of the pixels when the current decoding unit does not include the portion located outside the boundary of the current picture, and skipping the producing the second predicted decoding unit when the current decoding unit includes the portion located outside the boundary of the current picture.

BRIEF DESCRIPTION OF THE DRAWINGS

The above and other features will become more apparent by describing in detail exemplary embodiments thereof with reference to the attached drawings in which.

DETAILED DESCRIPTION OF EXEMPLARY EMBODIMENTS

Hereinafter, the exemplary embodiments will be described more fully with reference to the accompanying drawings, in which exemplary embodiments are shown. In the exemplary embodiments, unit may or may not refer to a unit of size, depending on its context.

A video encoding method and apparatus and a video decoding method and apparatus according to exemplary embodiments will now be described with reference to FIGS. 1 to 13.

Hereinafter, a coding unit is an encoding data unit in which the image data is encoded at an encoder side and an encoded data unit in which the encoded image data is decoded at a decoder side, according to exemplary embodiments. Also, a coded depth indicates a depth where a coding unit is encoded. Furthermore, an image may denote a still image for a video or a moving image, that is, the video itself.

Figure 1:
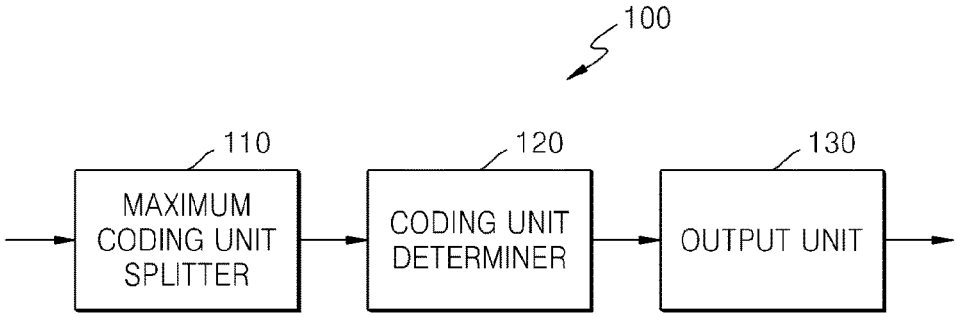
FIG. 1 is a block diagram of an apparatus for encoding a video, according to an exemplary embodiment.

FIG. 1 is a block diagram of a video encoding apparatus 100, according to an exemplary embodiment. The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a prediction unit. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a transform unit. A transformation depth indicating the number of splitting times to reach the transform unit by splitting the height and width of the coding unit may also be set in the transform unit. For example, in a current coding unit of 2N×2N, a transformation depth may be 0 when the size of a transform unit is also 2N×2N, may be 1 when each of the height and width of the current coding unit is split into two equal parts, totally split into $4^1$ transform units, and the size of the transform unit is thus N×N, and may be 2 when each of the height and width of the current coding unit is split into four equal parts, totally split into $4^2$ transform units and the size of the transform unit is thus N/2×N/2. For example, the transform unit may be set according to a hierarchical tree structure, in which a transform unit of an upper transformation depth is split into four transform units of a lower transformation depth according to the hierarchical characteristics of a transformation depth.

Similarly to the coding unit, the transform unit in the coding unit may be recursively split into smaller sized regions, so that the transform unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transform unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transform unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transform units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
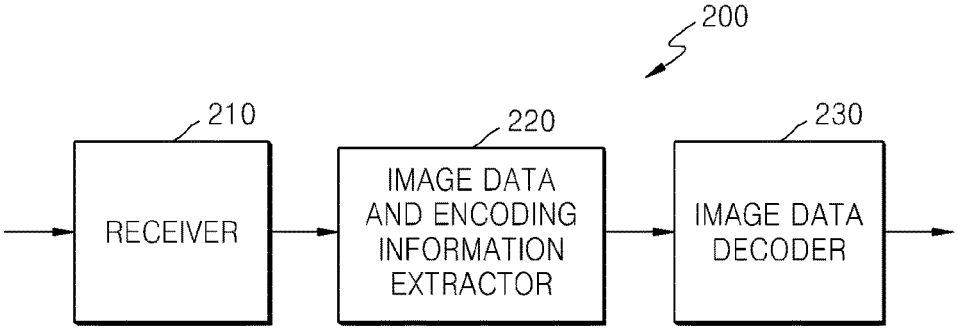
FIG. 2 is a block diagram of an apparatus for decoding a video, according to an exemplary embodiment.

FIG. 2 is a block diagram of a video decoding apparatus 200, according to an exemplary embodiment. The video decoding apparatus 200 includes a receiver 210, an image data and encoding information extractor 220, and an image data decoder 230. Definitions of various terms, such as a coding unit, a depth, a prediction unit, a transform unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transform unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transform unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transform unit in the coding unit, based on the information about the size of the transform unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transform unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transform unit, according to an exemplary embodiment, will now be described with reference to FIGS. 3 through 13.

Figure 3:
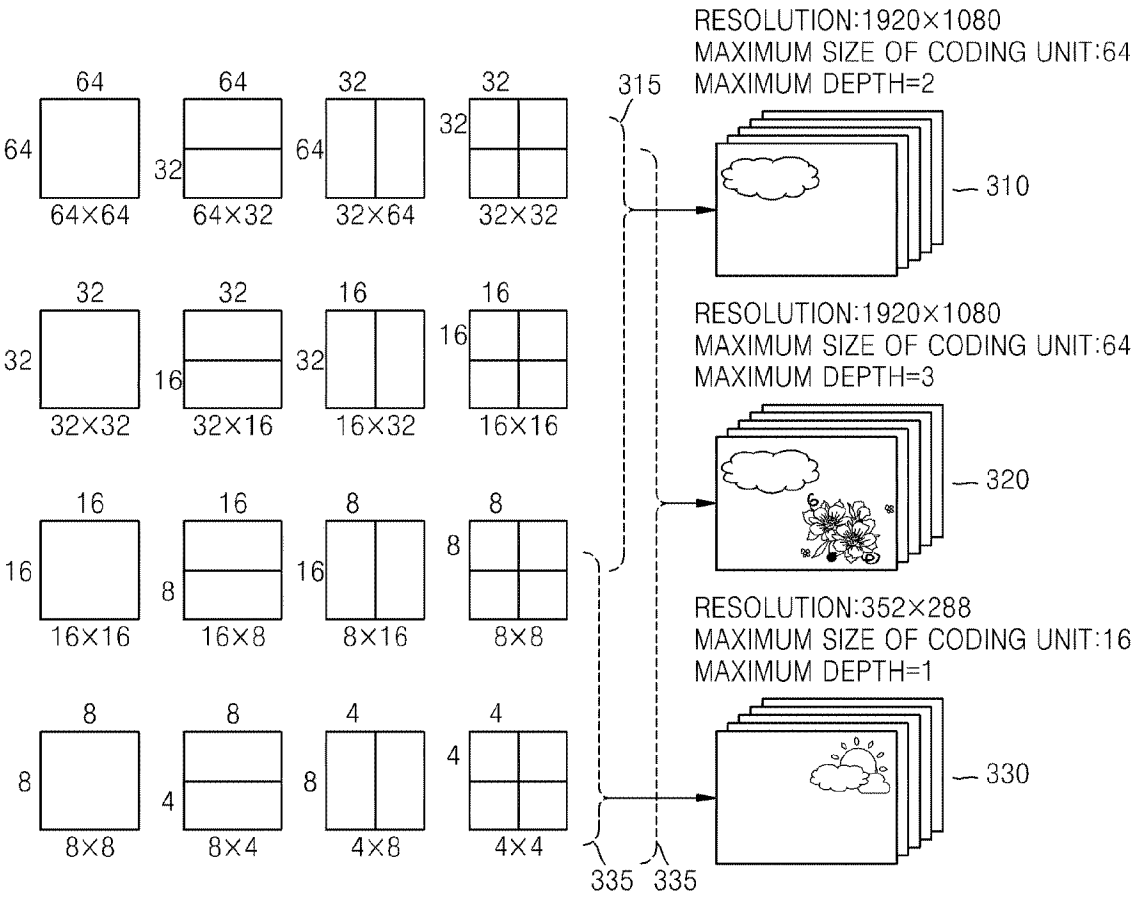
FIG. 3 is a diagram for describing a concept of coding units according to an exemplary embodiment.

FIG. 3 is a diagram for describing a concept of coding units according to an exemplary embodiment. A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
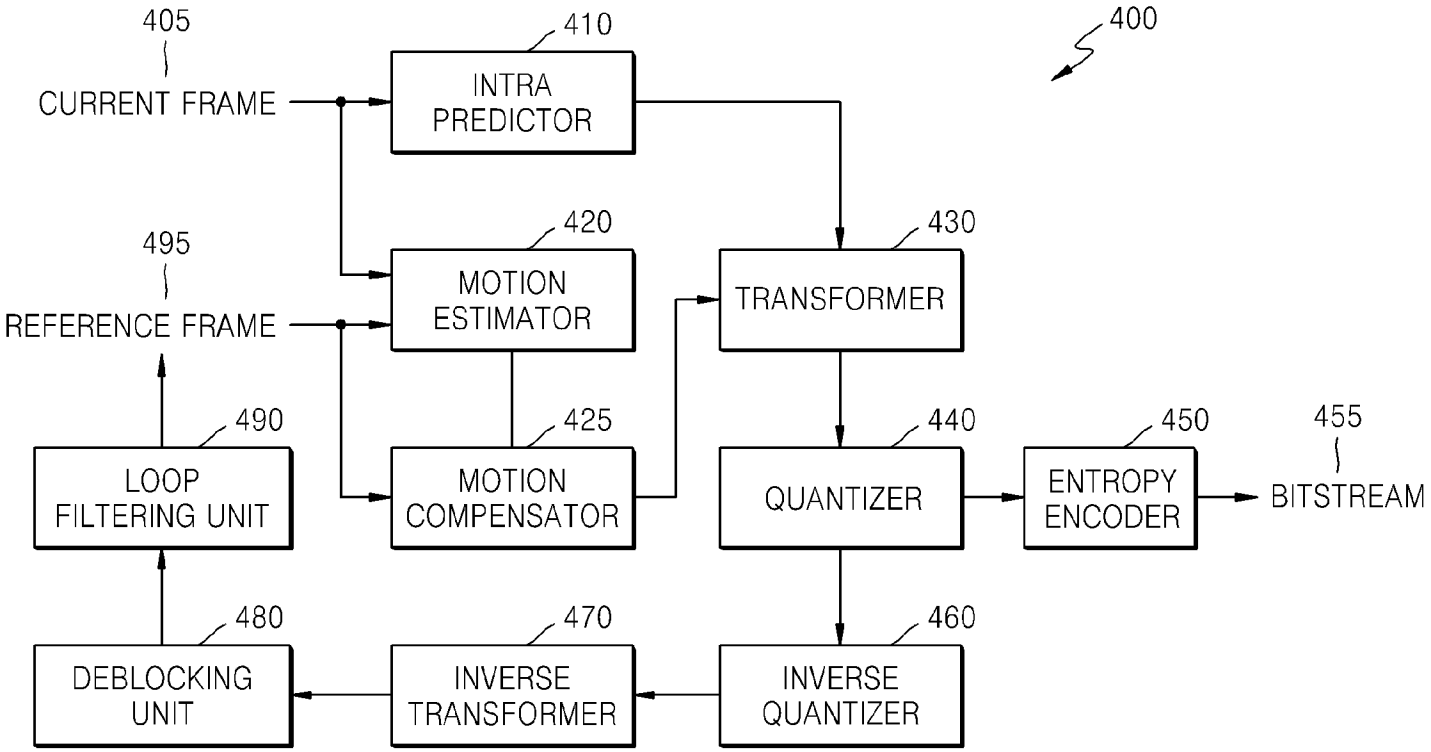
FIG. 4 is a block diagram of an image encoder based on coding units according to an exemplary embodiment.

FIG. 4 is a block diagram of an image encoder 400 based on coding units, according to an exemplary embodiment. The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transform unit in each coding unit from among the coding units having a tree structure.

Figure 5:
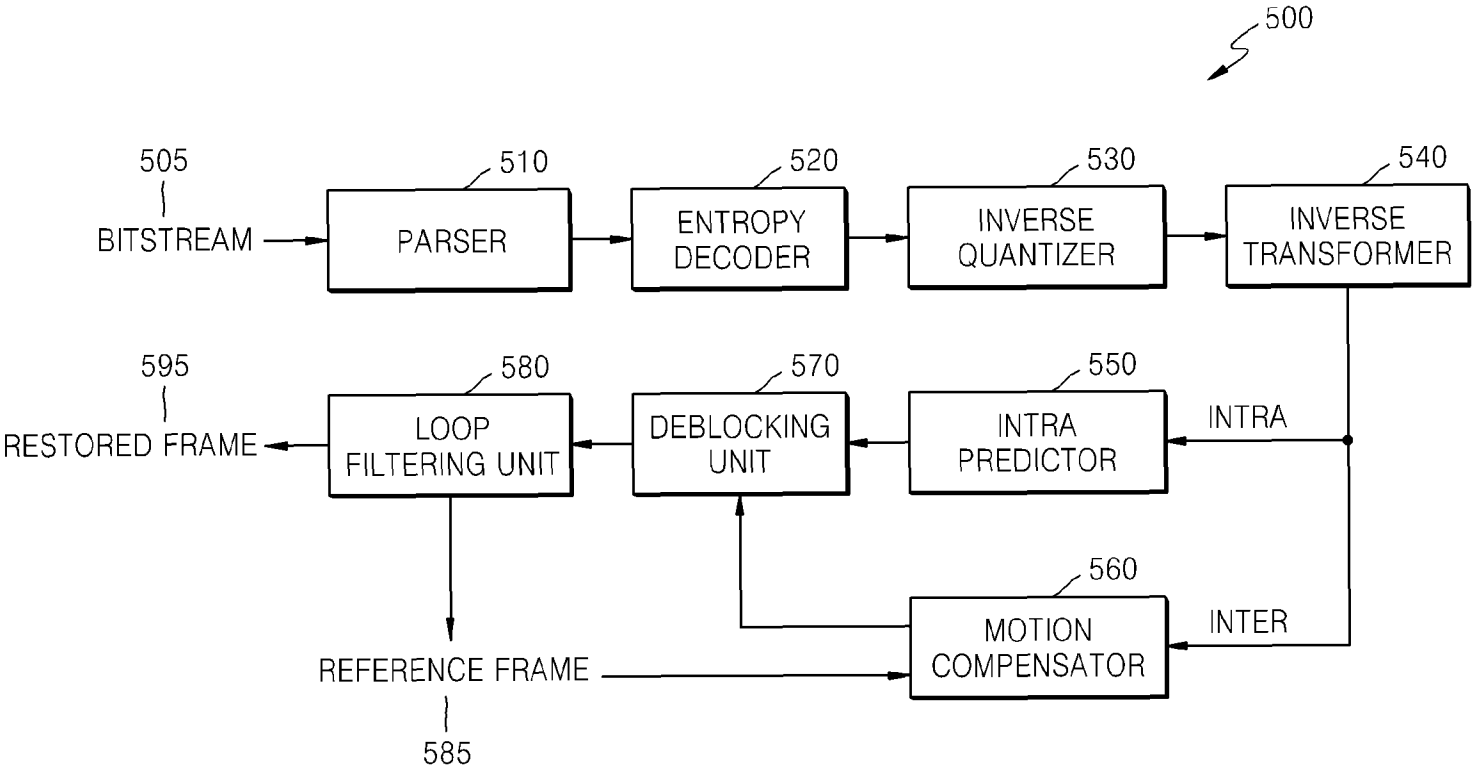
FIG. 5 is a block diagram of an image decoder based on coding units according to an exemplary embodiment.

FIG. 5 is a block diagram of an image decoder 500 based on coding units, according to an exemplary embodiment. A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transform unit for each coding unit.

Figure 6:
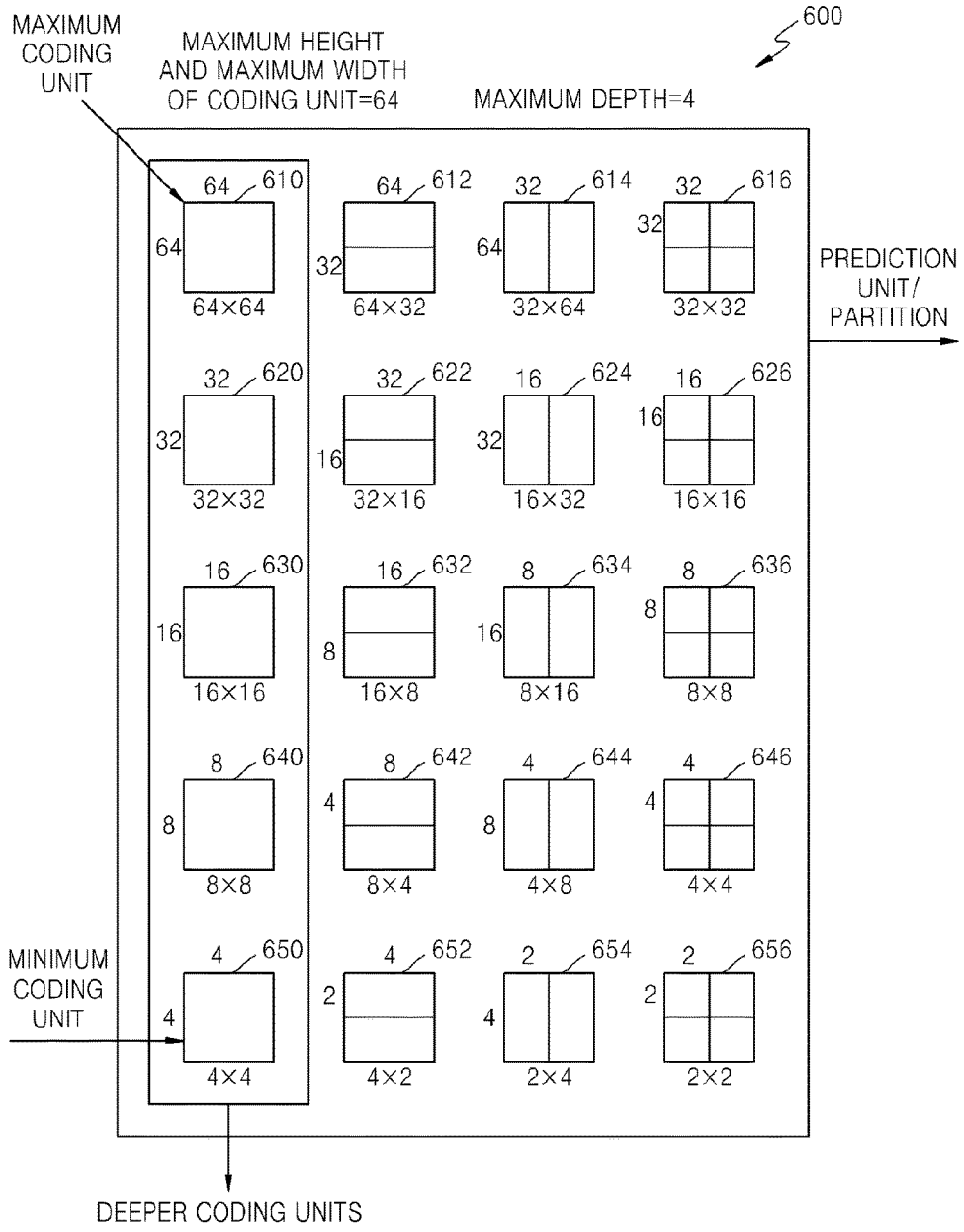
FIG. 6 is a diagram illustrating deeper coding units according to depths, and partitions according to an exemplary embodiment.

FIG. 6 is a diagram illustrating deeper coding units according to depths, and partitions, according to an exemplary embodiment. The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
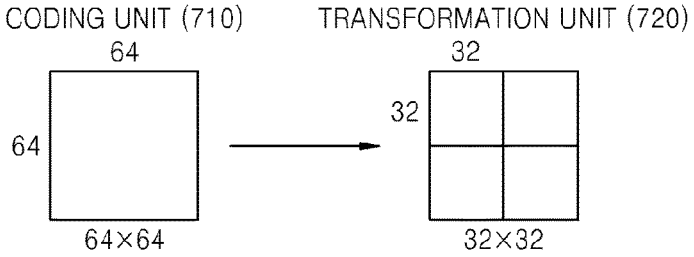
FIG. 7 is a diagram for describing a relationship between a coding unit and transform units, according to an exemplary embodiment.

FIG. 7 is a diagram for describing a relationship between a coding unit 710 and transform units 720, according to an exemplary embodiment.

The video encoding apparatus 100 or 200 encodes or decodes an image according to coding units having sizes smaller than or equal to a maximum coding unit for each maximum coding unit. Sizes of transform units for transformation during encoding may be selected based on data units that are not larger than a corresponding coding unit.

For example, in the video encoding apparatus 100 or 200, if a size of the coding unit 710 is 64×64, transformation may be performed by using the transform units 720 having a size of 32×32.

Also, data of the coding unit 710 having the size of 64×64 may be encoded by performing the transformation on each of the transform units having the size of 32×32, 16×16, 8×8, and 4×4, which are smaller than 64×64, and then a transform unit having the least coding error may be selected.

Figure 8:
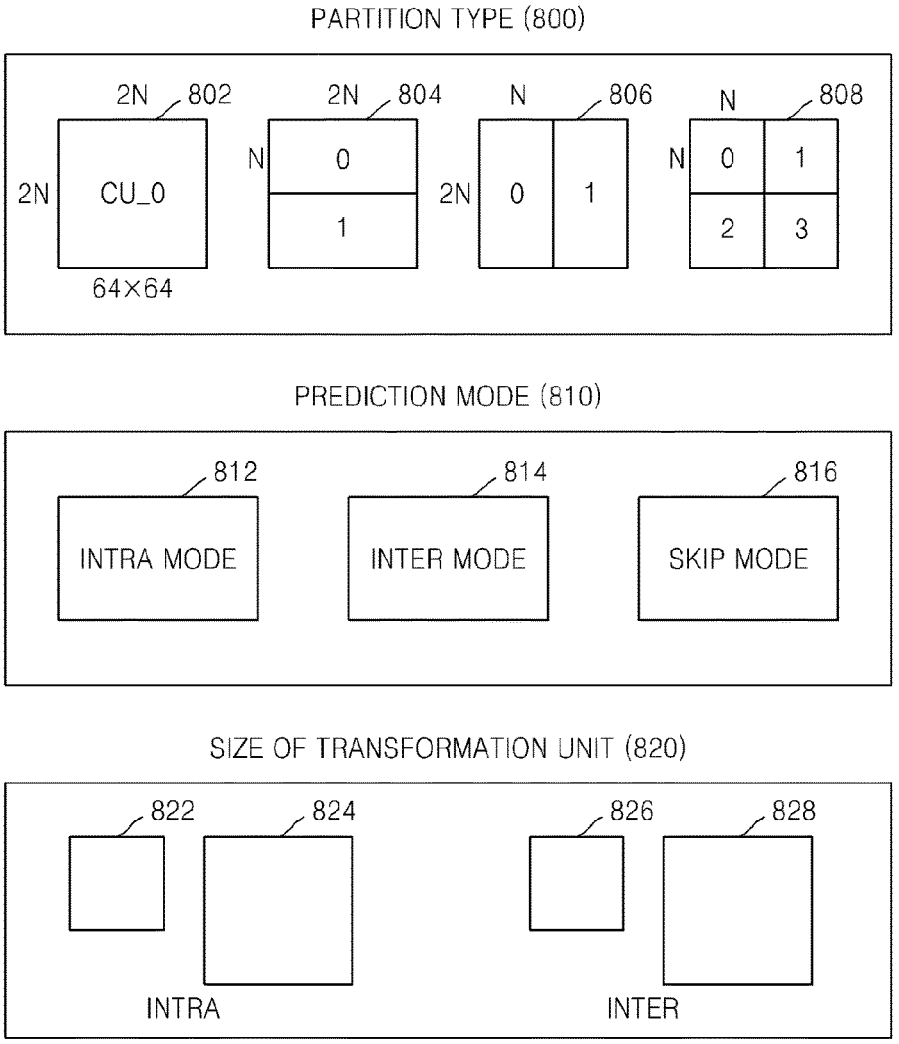
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment. The output unit 130 of the video encoding apparatus 100 may encode and transmit information 800 about a partition type, information 810 about a prediction mode, and information 820 about a size of a transform unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transform unit to be based on when transformation is performed on a current coding unit. For example, the transform unit may be a first intra transform unit 822, a second intra transform unit 824, a first inter transform unit 826, or a second intra transform unit 828.

The image data and encoding information extractor 220 of the video decoding apparatus 200 may extract and use the information 800, 810, and 820 for decoding, according to each deeper coding unit.

Figure 9:
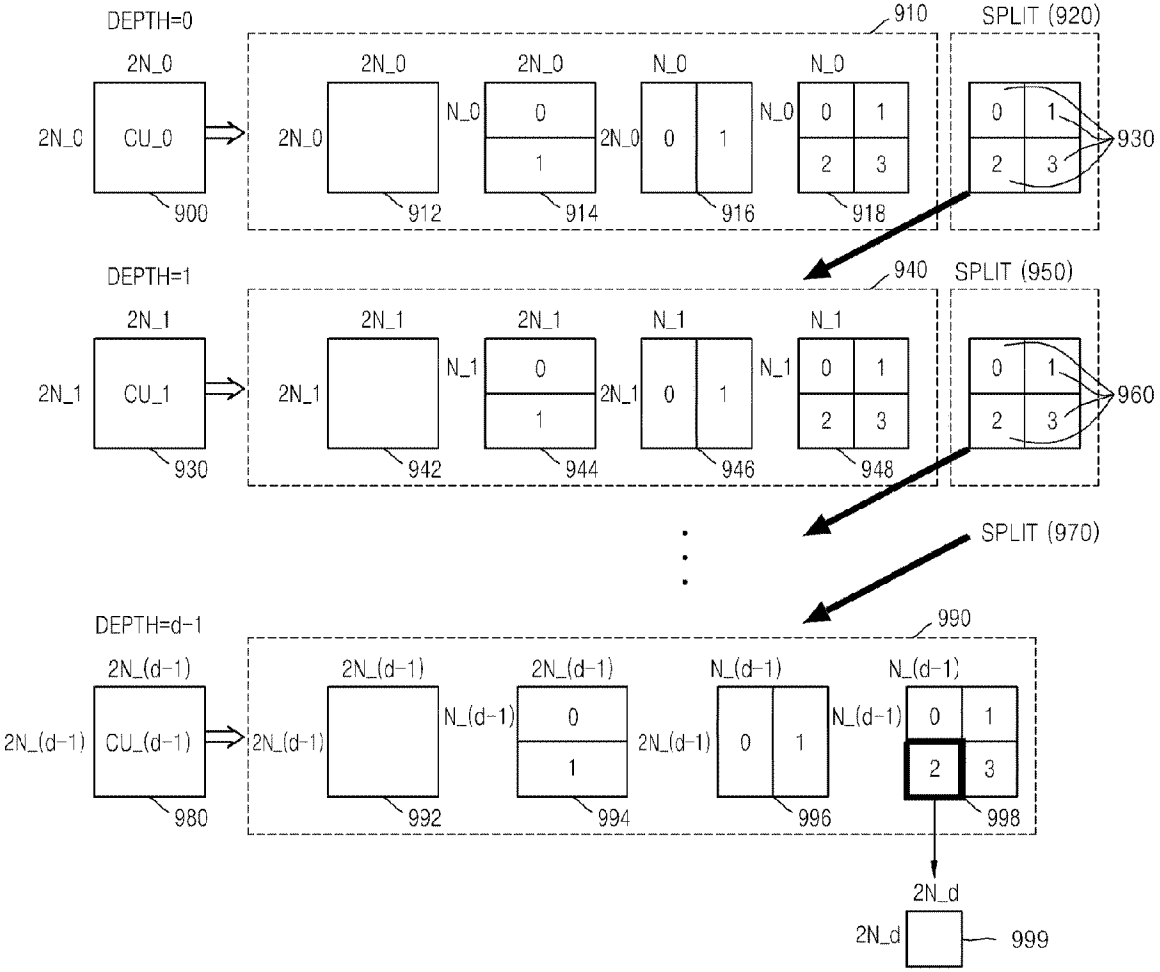
FIG. 9 is a diagram of deeper coding units according to depths, according to an exemplary embodiment.

FIG. 9 is a diagram of deeper coding units according to depths, according to an exemplary embodiment. Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N 0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a minimum unit for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
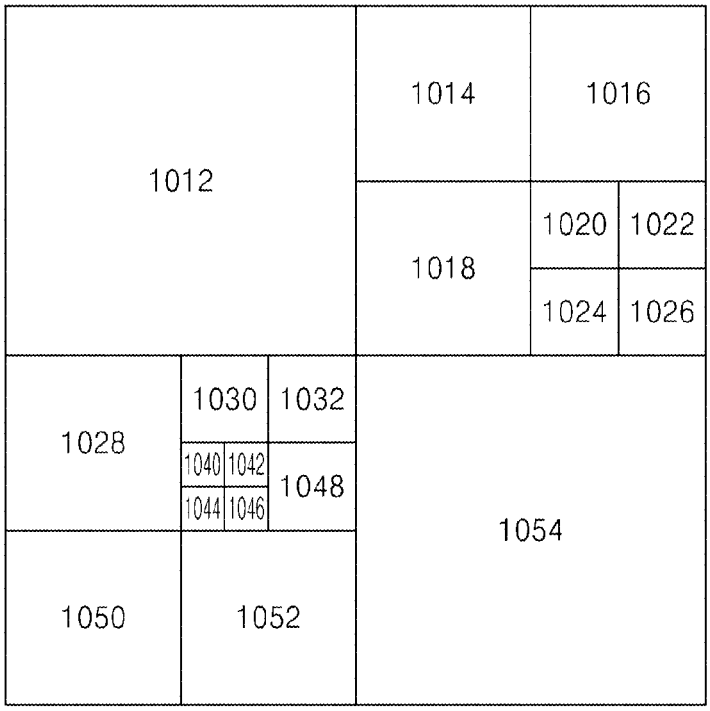
FIGS. 10 through 12 are diagrams for describing a relationship between coding units, prediction units, and transform units, according to an exemplary embodiment.
Figure 11:
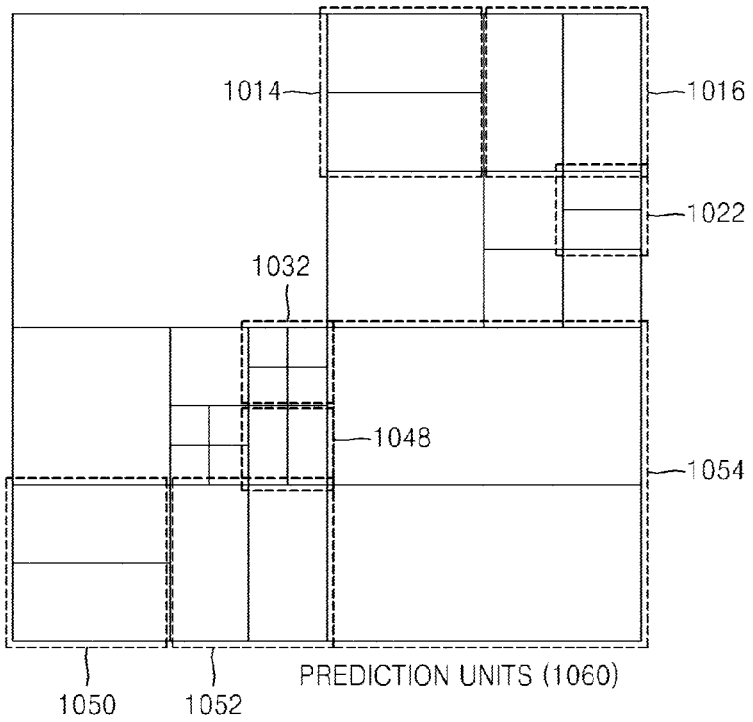
Figure 12:
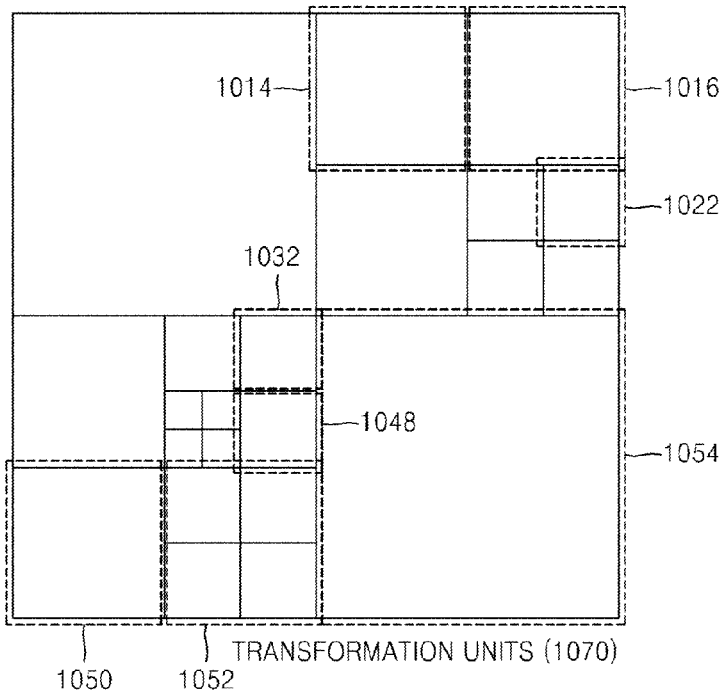

FIGS. 10 through 12 are diagrams for describing a relationship between coding units 1010, prediction units 1060, and transform units 1070, according to an exemplary embodiment. The coding units 1010 are coding units having a tree structure, corresponding to coded depths determined by the video encoding apparatus 100, in a maximum coding unit. The prediction units 1060 are partitions of prediction units of each of the coding units 1010, and the transform units 1070 are transform units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transform units 1070 in a data unit that is smaller than the coding unit 1052. Also, the coding units 1014, 1016, 1022, 1032, 1048, 1050, and 1052 in the transform units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transform unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transform Unit | | Repeatedly Encode Coding Units having Lower Depth of d + 1 |
| Intra<br>Inter<br>Skip (Only 2N × 2N) | Symmetrical Partition Type<br>2N × 2N<br>2N × N<br>N × 2N<br>N × N | Asymmetrical Partition Type<br>2N × nU<br>2N × nD<br>nL × 2N<br>nR × 2N | Split Information 0 of Transformation Unit<br>2N × 2N | Split Information 1 of Transformation Unit<br>N × N (Symmetrical Type)<br>N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transform unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transform unit may be set to be two types in the intra mode and two types in the inter mode. In other words, if split information of the transform unit is 0, the size of the transform unit may be 2N×2N, which is the size of the current coding unit. If split information of the transform unit is 1, the transform units may be obtained by splitting the current coding unit. Also, if a partition type of the current coding unit having the size of 2N×2N is a symmetrical partition type, a size of a transform unit may be N×N, and if the partition type of the current coding unit is an asymmetrical partition type, the size of the transform unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred for predicting the current coding unit.

Figure 13:
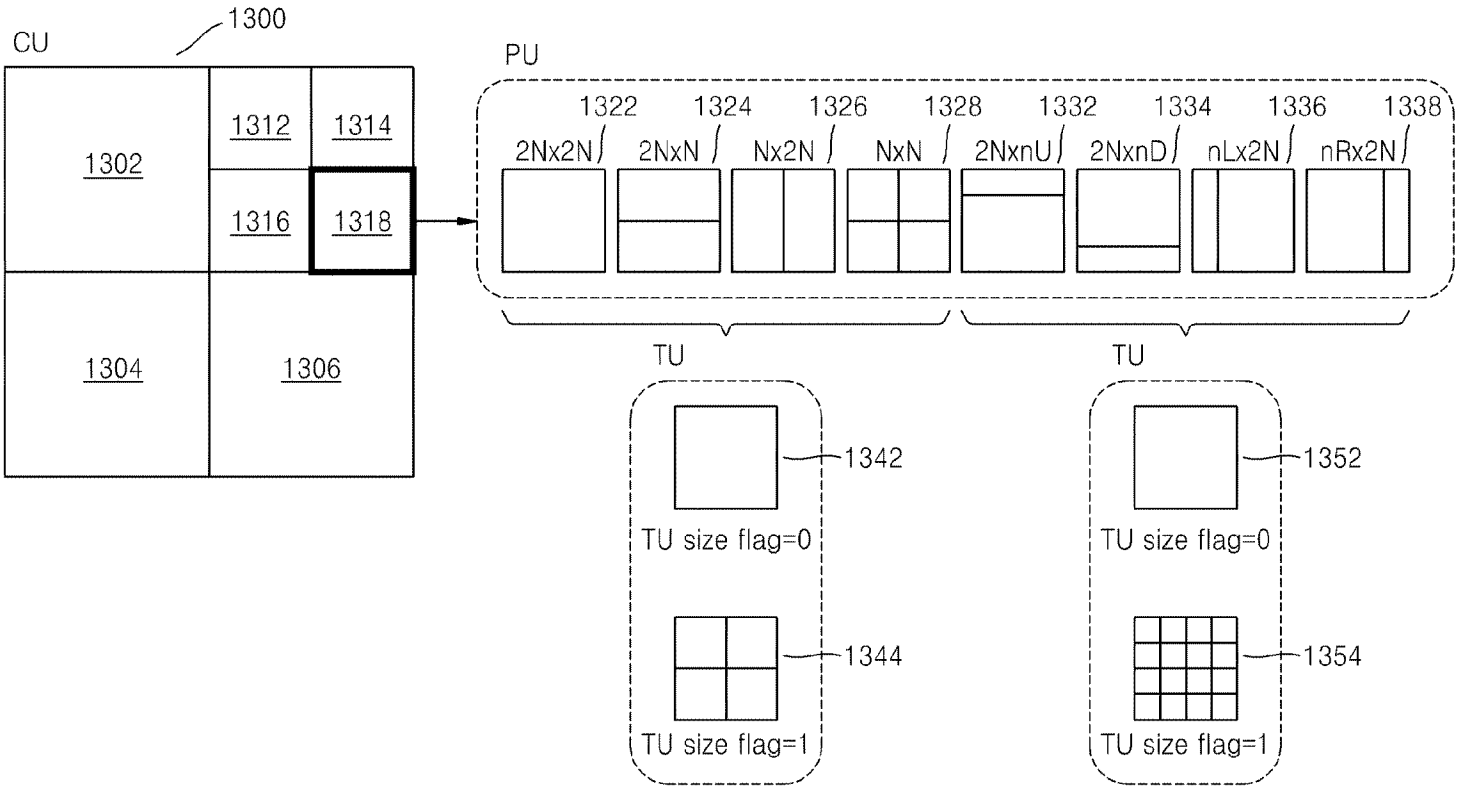
FIG. 13 is a diagram for describing a relationship between a coding unit, a prediction unit or a partition, and a transform unit, according to encoding mode information of Table 1.

FIG. 13 is a diagram for describing a relationship between a coding unit, a prediction unit or a partition, and a transform unit, according to encoding mode information of Table 1. A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transform unit 1342 having a size of 2N×2N is set if split information (TU size flag) of a transform unit is 0, and a transform unit 1344 having a size of N×N is set if a TU size flag is 1.

When the partition type is set to be asymmetrical, i.e., the partition type 1332, 1334, 1336, or 1338, a transform unit 1352 having a size of 2N×2N is set if a TU size flag is 0, and a transform unit 1354 having a size of N/2×N/2 is set if a TU size flag is 1.

Referring to FIG. 13, the TU size flag is a flag having a value or 0 or 1, but the TU size flag is not limited to 1 bit, and a transform unit may be hierarchically split having a tree structure while the TU size flag increases from 0.

In this case, the size of a transform unit that has been actually used may be expressed by using a TU size flag of a transform unit, according to an exemplary embodiment, together with a maximum size and minimum size of the transform unit. According to an exemplary embodiment, the video encoding apparatus 100 is capable of encoding maximum transform unit size information, minimum transform unit size information, and a maximum TU size flag. The result of encoding the maximum transform unit size information, the minimum transform unit size information, and the maximum TU size flag may be inserted into an SPS. According to an exemplary embodiment, the video decoding apparatus 200 may decode video by using the maximum transform unit size information, the minimum transform unit size information, and the maximum TU size flag.

For example, if the size of a current coding unit is 64×64 and a maximum transform unit size is 32×32, then the size of a transform unit may be 32×32 when a TU size flag is 0, may be 16×16 when the TU size flag is 1, and may be 8×8 when the TU size flag is 2.

As another example, if the size of the current coding unit is 32×32 and a minimum transform unit size is 32×32, then the size of the transform unit may be 32×32 when the TU size flag is 0. Here, the TU size flag cannot be set to a value other than 0, since the size of the transform unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is MaxTransformSizeIndex, a minimum transform unit size is MinTransformSize, and a transform unit size is RootTuSize when the TU size flag is 0, then a current minimum transform unit size CurrMinTuSize that can be determined in a current coding unit, may be defined by Equation (1):

$$\text{CurrMinTuSize}=\max(\text{MinTransformSize},\text{RootTuSize}/(2\hat{}\text{MaxTransformSizeIndex})) \quad (1)$$

Compared to the current minimum transform unit size CurrMinTuSize that can be determined in the current coding unit, a transform unit size RootTuSize when the TU size flag is 0 may denote a maximum transform unit size that can be selected in the system. In Equation (1), RootTuSize/(2^MaxTransformSizeIndex) denotes a transform unit size when the transform unit size RootTuSize, when the TU size flag is 0, is split a number of times corresponding to the maximum TU size flag, and MinTransformSize denotes a minimum transformation size. Thus, a smaller value from among RootTuSize/(2^MaxTransformSizeIndex) and MinTransformSize may be the current minimum transform unit size CurrMinTuSize that can be determined in the current coding unit.

According to an exemplary embodiment, the maximum transform unit size RootTuSize may vary according to the type of a prediction mode.

For example, if a current prediction mode is an inter mode, then RootTuSize may be determined by using Equation (2) below. In Equation (2), MaxTransformSize denotes a maximum transform unit size, and PUSize denotes a current prediction unit size.

$$\text{RootTuSize}=\min(\text{MaxTransformSize},\text{PUSize}) \quad (2)$$

That is, if the current prediction mode is the inter mode, the transform unit size RootTuSize when the TU size flag is 0, may be a smaller value from among the maximum transform unit size and the current prediction unit size.

If a prediction mode of a current partition unit is an intra mode, RootTuSize may be determined by using Equation (3) below. In Equation (3), PartitionSize denotes the size of the current partition unit.

$$\text{RootTuSize}=\min(\text{MaxTransformSize},\text{PartitionSize}) \quad (3)$$

That is, if the current prediction mode is the intra mode, the transform unit size RootTuSize when the TU size flag is 0 may be a smaller value from among the maximum transform unit size and the size of the current partition unit.

However, the current maximum transform unit size RootTuSize that varies according to the type of a prediction mode in a partition unit is just an example and is not limited thereto.

Intra prediction performed by the intra predictor 410 of the image encoder 400 illustrated in FIG. 4 and the intra predictor 550 of the image decoder 500 illustrated in FIG. 5 according to one or more exemplary embodiments, will now be described in detail. In the following description, an encoding unit denotes a current encoded block in an encoding process of an image, and a decoding unit denotes a current decoded block in a decoding process of an image. The encoding unit and the decoding unit are different in that the encoding unit is used in the encoding process and the decoding unit is used in the decoding. For the consistency of terms, except for a particular case, the encoding unit and the decoding unit may be referred to as a coding unit in both the encoding and decoding processes. Also, one of ordinary skill in the art would understand by the present specification that an intra prediction method and apparatus according to an exemplary embodiment may also be applied to perform intra prediction in a general video codec.

Figures 14, 15:
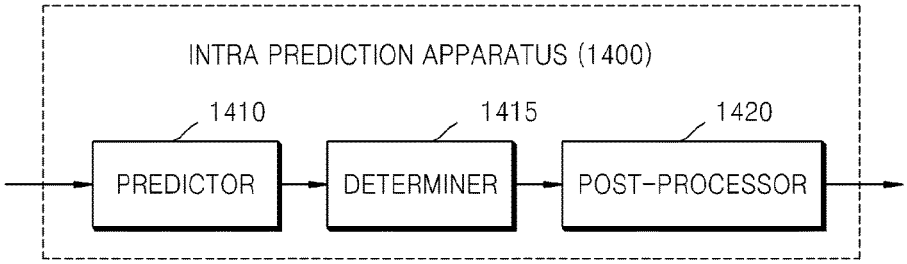
FIG. 14 is a block diagram of an intra prediction apparatus according to an exemplary embodiment.
FIG. 15 is a table showing a number of intra prediction modes according to the size of a coding unit, according to an exemplary embodiment.

FIG. 14 is a block diagram of an intra prediction apparatus 1400 according to an exemplary embodiment. Referring to FIG. 14, the intra prediction apparatus 1400 includes a predictor 1410, a determiner 1415, and a post-processor 1420. The predictor 1410 intra predicts a current coding unit by using intra prediction modes determined according to the size of the current coding unit, and outputs a first predicted coding unit. The determiner 1415 determines whether the current coding unit has a portion located outside a boundary of a current picture, and produces an index MPI_PredMode according to the determination result.

The index MPI_PredMode indicates whether what kind of Multi-Parameter Intra-prediction (MPI), which will be described in detail later, is to be performed. Referring to Table 2, if the index MPI_PredMode is 0, it indicates that the MPI is not performed to produce a second predicted coding unit, and if the index MPI_PredMode is greater than 0, it indicates that the MPI is to be performed so as to produce the second predicted coding unit.

TABLE 2

| MPI_PredMode | MPI Mode Name | Meaning |
|---|---|---|
| 0 | MPI_Mode0 | Do not perform MPI |
| 1 | MPI_Mode1 | Perform MPI |
| . . . | . . . | . . . |
| MPI_PredModelMAX | MPI_ModelMAX | Perform MPI |

According to Table 2, the index MPI_PredMode is 0 or 1 depending on whether the MPI is to be performed. However, in a case where N modes are present as MPI modes, the MPI_PredMode may have integral value ranging from 0 to N so as to express the case where the MPI will not be performed and the N modes.

If the determiner 1415 determines that the current coding unit does not include any portion located outside a boundary of the picture, that is, when the index MPI_PredMode is not 0, then the post-processor 1420 produces the second predicted coding unit by perform the MPI by using neighboring pixels of pixels that constitute the first predicted coding unit so as to change the pixel values of the pixels of the first predicted coding unit.

FIG. 15 is a table showing a number of intra prediction modes according to the size of a coding unit, according to an exemplary embodiment. According to an exemplary embodiment, a number of intra prediction modes may be determined according to the size of a coding unit (a decoding unit in the case of a decoding process). Referring to FIG. 15, if the size of a coding unit that is to be intra predicted is, for example, N×N, then numbers of intra prediction modes that are to be actually performed on prediction units having sizes of NMin×NMin, . . . , NMax×NMax (NMin can be 2 and NMax can be 128) may be depend on prediction unit size. In Example 2 prediction unit sizes are 4×4, 8×8, 16×16, 32×32, 64×64 and 128×128. The number of intra prediction modes in this example are 5, 9, 9, 17, 33, 5, and 5, respectively. For another example, when a size of a coding unit to be intra-predicted is N×N, numbers of intra prediction modes to be actually performed on coding units having sizes of 2×2, 4×4, 8×8, 16×16, 32×32, 64×64, and 128×128 may be set to be 3, 17, 34, 34, 34, 5, and 5. A reason why a number of intra prediction modes that are to be actually performed is determined according to the size of a coding unit, is because overhead for encoding prediction mode information varies according to the size of the coding unit. In other words, although a small-sized coding unit occupies a small area in an entire image, overhead for transmitting additional information, e.g., a prediction mode, regarding the small-sized coding unit may be large. Thus, when a small-sized coding unit is encoded using too many prediction modes, a number of bits may increase, thus degrading compression efficiency. A large-sized coding unit, e.g., a coding unit having a size of 64×64 or more, is highly likely to be selected as a coding unit for a flat region of an image. Compression efficiency may also be degraded when a large-sized coding unit selected to encode such a flat region is encoded using too many prediction modes.

Thus, according to an exemplary embodiment, coding unit size may be largely classified into at least three sizes: N1×N1 (2≤N1≤4, N1 denotes an integer), N2×N2 (8≤N2≤32, N2 denotes an integer), and N3×N3 (64≤N3, N3 denotes an integer). If a number of intra prediction modes that are to be performed on each coding unit having a size of N1×N1 is A1 (A1 denotes a positive integer), a number of intra prediction modes that are to be performed on each coding unit having a size of N2×N2 is A2 (A2 denotes a positive integer), and a number of intra prediction modes that are to be performed on each coding unit having a size of N3×N3 is A3 (A3 denotes a positive integer), then a number of intra prediction modes that are to be performed according to the size of a coding unit, may be determined to satisfy A3≤A1≤A2. That is, if a current picture is divided into a small-sized coding unit, a medium-sized coding unit, and a large-sized coding unit, then a number of prediction modes that are to be performed on the medium-sized coding unit may be greater than those of prediction modes to be performed on the small-sized coding unit and the large-sized coding unit. However, another exemplary embodiment is not limited thereto and a large number of prediction modes may also be set to be performed on the small-sized and medium-sized coding units. The numbers of prediction modes according to the size of each coding unit illustrated in FIG. 15 are just an example and may thus be variable.

Figures 16A, 16B:
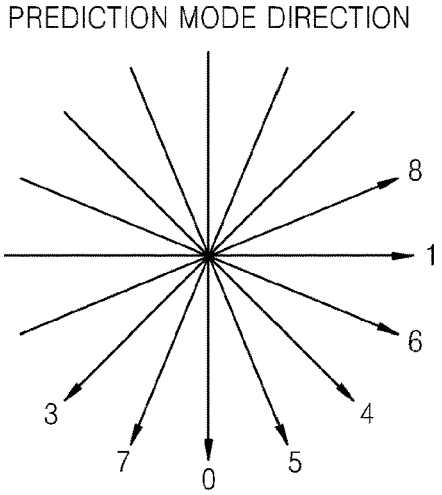
FIGS. 16A to 16C are diagrams for explaining intra prediction modes that may be performed on a coding unit having a predetermined size, according to exemplary embodiments.
Figure 16C:
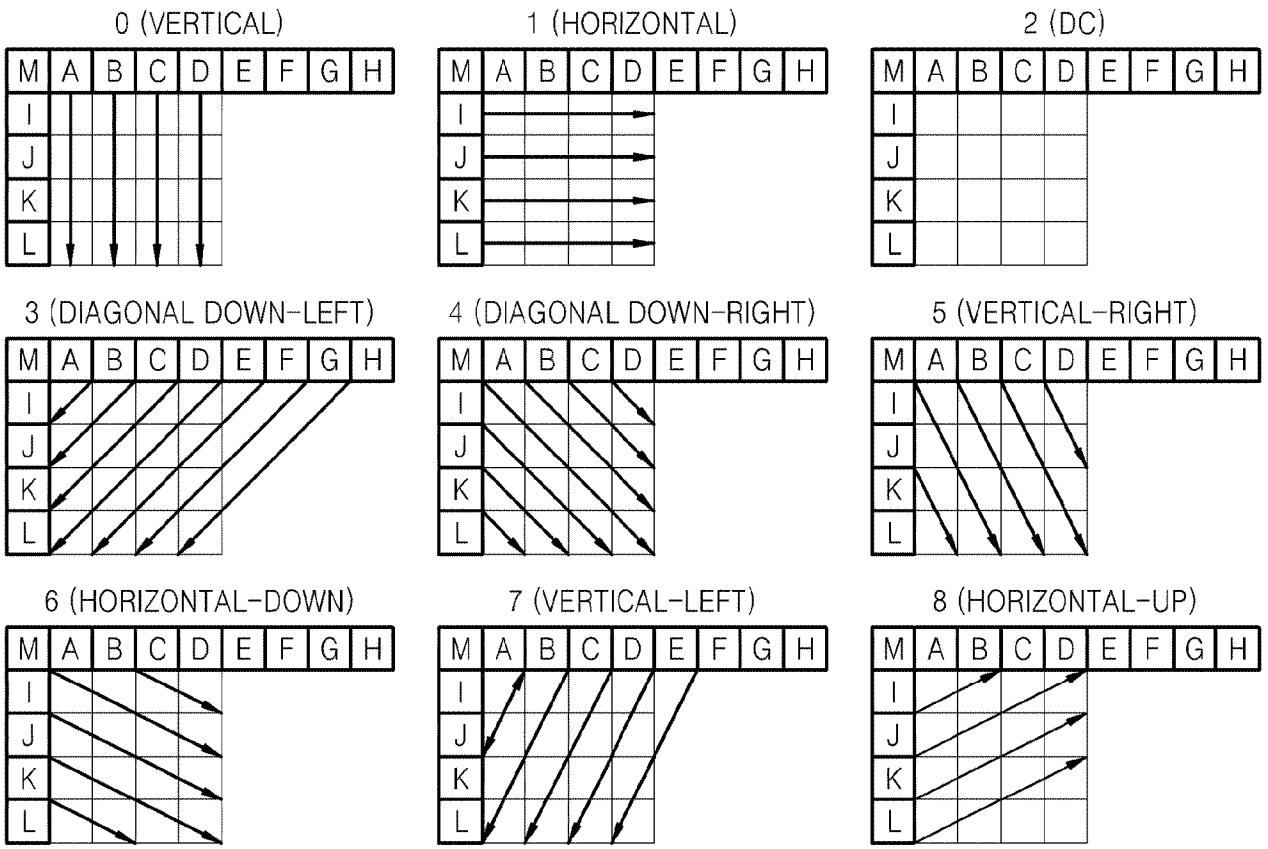

FIGS. 16A to 16C are drawings for explaining intra prediction modes that may be performed on a coding unit having a predetermined size, according to exemplary embodiments. FIG. 16A is a table showing intra prediction modes that may be performed on a coding unit having a predetermined size, according to an exemplary embodiment. Referring to FIGS. 15 and 16A, for example, if a coding unit having a size of 4×4 is intra predicted, a vertical mode (mode 0), a horizontal mode (mode 1), a direct-current (DC) mode (mode 2), a diagonal down-left mode (mode 3), a diagonal down-right mode (mode 4), a vertical-right mode (mode 5), a horizontal-down mode (mode 6), a vertical-left mode (mode 7), or a horizontal-up mode (mode 8) may be performed.

FIG. 16B illustrate directions of the intra prediction modes illustrated in FIG. 16A, according to an exemplary embodiment. In FIG. 16B, values assigned to arrows denote mode values when prediction is performed in directions indicated with the arrows, respectively. Here, mode 2 is a DC prediction mode having no direction and is thus not illustrated in FIG. 16B.

FIG. 16C illustrate intra prediction methods that may be performed on the coding unit illustrated in FIG. 16A, according to an exemplary embodiment. Referring to FIG. 16C, a predicted coding unit is produced using neighboring pixels A to M of a current coding unit according to an available intra prediction mode determined according to the size of the current coding unit. For example, a method of prediction encoding a current coding unit having a size of 4×4 according to the vertical mode (mode 0) of FIG. 16A, will be described. First, pixel values of the pixels A to D adjacent to the top of the 4×4 coding unit are predicted as pixel values of the 4×4 coding unit. Specifically, the pixel values of the pixel A are predicted as four pixel values of pixels at a first column of the 4×4 coding unit, the pixel values of the pixel B are predicted as four pixel values of pixels at a second column of the 4×4 coding unit, the pixel values of the pixel C are predicted as four pixel values of pixels at a third column of the 4×4 coding unit, and the pixel values of the pixel D are predicted as four pixel values of pixels at a fourth column of the 4×4 current coding unit. Then, error values between actual pixel values of pixels included in a predicted 4×4 coding unit predicted using the pixels A to D and the original 4×4 coding unit are calculated and encoded.

Figure 17:
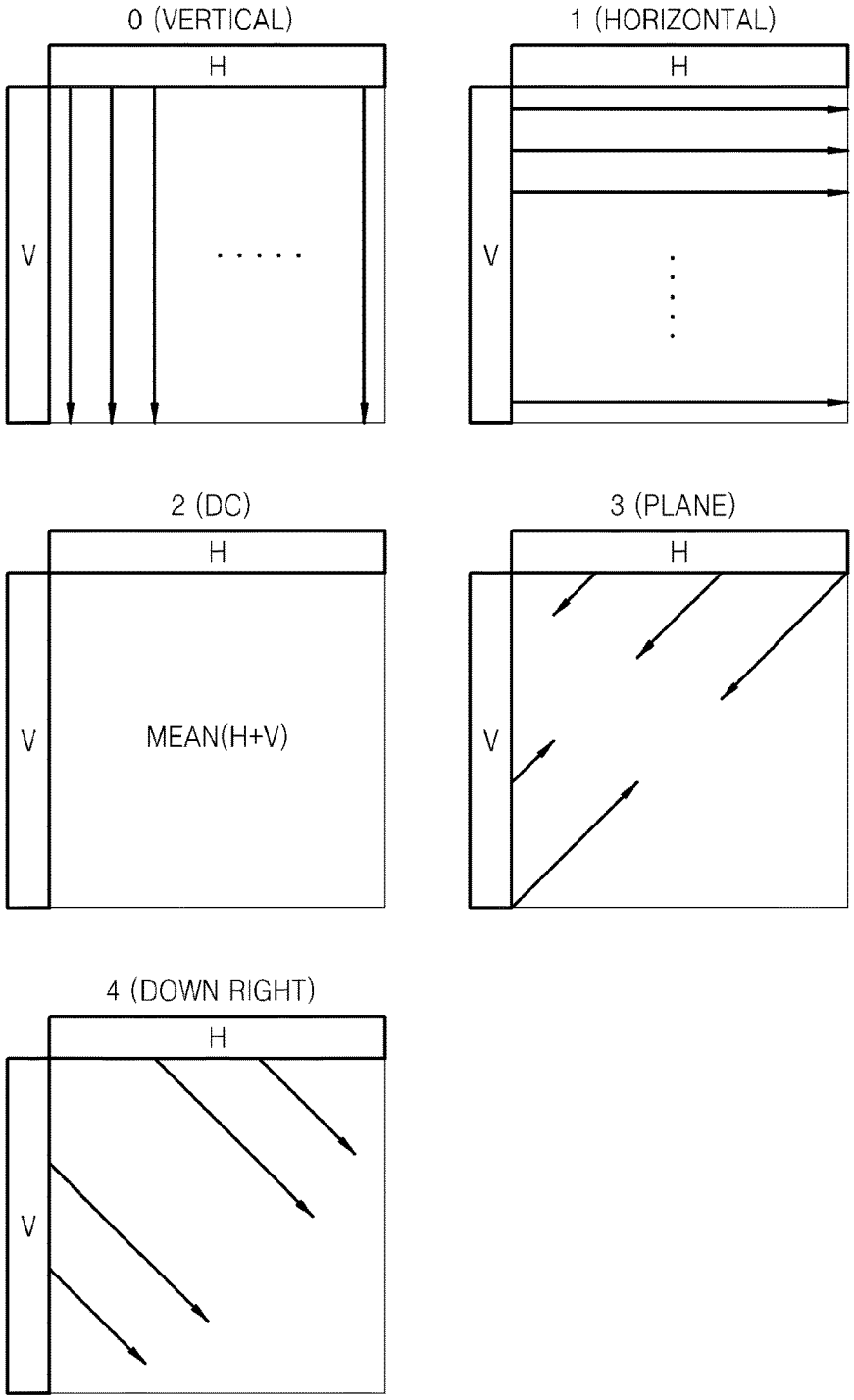
FIG. 17 is a drawing for explaining intra prediction modes that may be performed on a coding unit having a predetermined size, according to other exemplary embodiments.

FIG. 17 is drawings for explaining intra prediction modes that may be performed on a coding unit having a predetermined size, according to other exemplary embodiments. Referring to FIGS. 15 and 17, for example, if a coding unit having a size of 2×2 is intra predicted, a total of five modes, e.g., a vertical mode, a horizontal mode, a DC mode, a plane mode, and a diagonal down-right mode, may be performed.

As illustrated in FIG. 15, if a coding unit having a size of 32×32 has 33 intra prediction modes, then directions of the 33 intra prediction modes should be set. According to an exemplary embodiment, a prediction direction for selecting neighboring pixels to be used as reference pixels based on pixels included in a coding unit, is set by using a dx parameter and a dy parameter so as to set intra prediction modes having various directionalities in addition to the intra prediction modes described above with reference to FIGS. 16 and 17. For example, when each of the 33 prediction modes is defined as mode N_(N is an integer from 0 to 32), mode 0, mode 1, mode 2, and mode 3 are set as a vertical mode, a horizontal mode, a DC mode, and a plane mode, respectively, and each of mode 4 to mode 31 may be set as a prediction mode having a directionality of $\tan^{-1}(dy/dx)$ by using a (dx, dy) parameter expressed with one from among (1,−1), (1,1), (1,2), (2,1), (1,−2), (2,1), (1,−2), (2,−1), (2,−11), (5,−7), (10,−7), (11,3), (4,3), (1,11), (1,−1), (12,−3), (1,−11), (1,−7), (3,−10), (5,−6), (7,−6), (7,−4), (11,1), (6,1), (8,3), (5,3), (5,7), (2,7), (5,−7), and (4,−3) shown in Table 3.

TABLE 3

| mode # | dx | dy |
|---|---|---|
| mode 4 | 1 | −1 |
| mode 5 | 1 | 1 |
| mode 6 | 1 | 2 |
| mode 7 | 2 | 1 |
| mode 8 | 1 | −2 |
| mode 9 | 2 | −1 |
| mode 10 | 2 | −11 |
| mode 11 | 5 | −7 |
| mode 12 | 10 | −7 |
| mode 13 | 11 | 3 |
| mode 14 | 4 | 3 |
| mode 15 | 1 | 11 |
| mode 16 | 1 | −1 |
| mode 17 | 12 | −3 |
| mode 18 | 1 | −11 |
| mode 19 | 1 | −7 |
| mode 20 | 3 | −10 |
| mode 21 | 5 | −6 |
| mode 22 | 7 | −6 |
| mode 23 | 7 | −4 |
| mode 24 | 11 | 1 |
| mode 25 | 6 | 1 |
| mode 26 | 8 | 3 |
| mode 27 | 5 | 3 |
| mode 28 | 5 | 7 |
| mode 29 | 2 | 7 |
| mode 30 | 5 | −7 |
| mode 31 | 4 | −3 |

Mode 0, mode 1, mode 2, mode 3, and mode 32 denote a vertical mode, a horizontal mode, a DC mode, a plane mode, and a Bi-linear mode, respectively.

Mode 32 may be set as a bi-linear mode that uses bi-linear interpolation as will be described later with reference to FIG. 19.

Figure 18A:
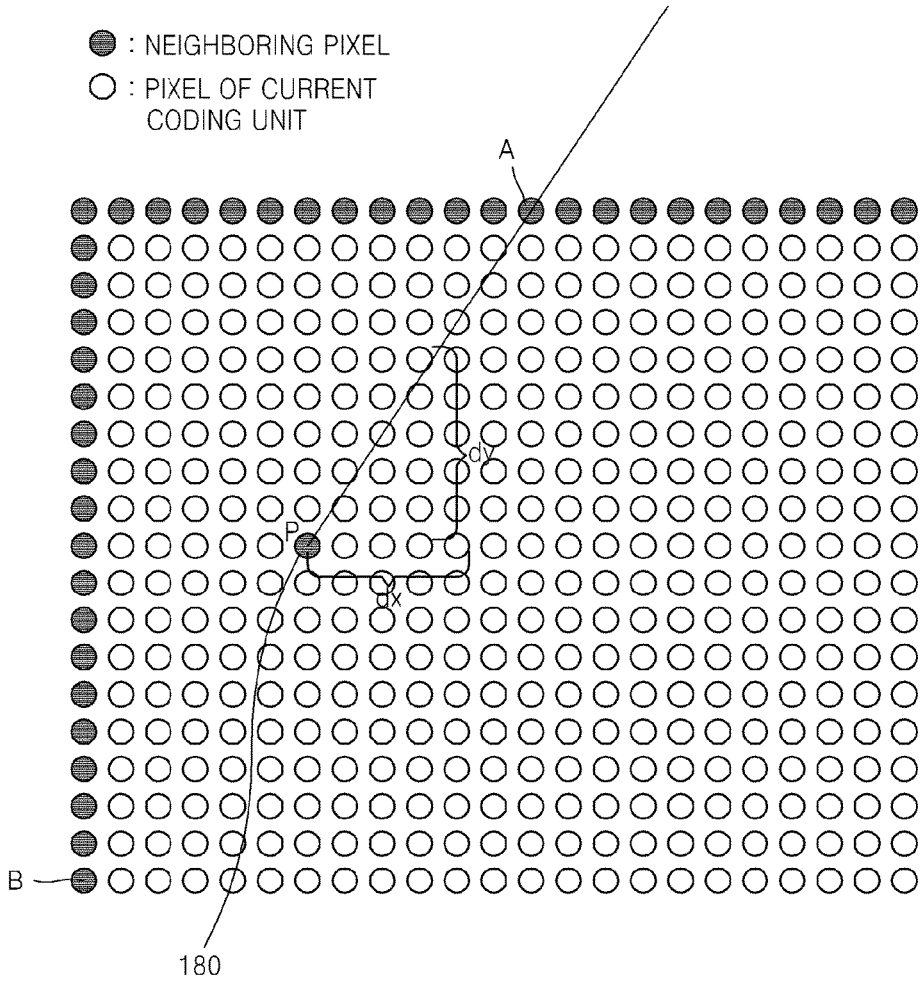
FIGS. 18A through 18C are reference diagrams for explaining inter prediction modes having various directionalities according to an exemplary embodiment.
Figure 18B:
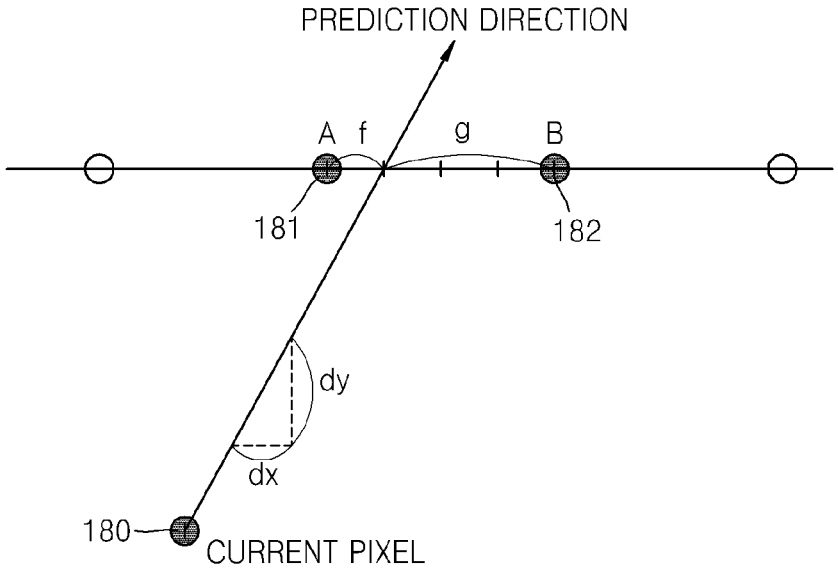
Figure 18C:
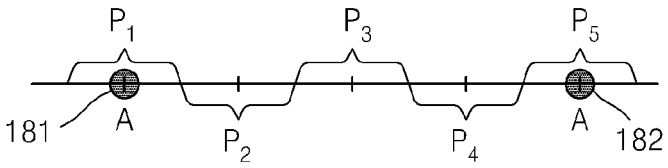

FIGS. 18A through 18C are reference diagrams for explaining intra prediction modes having various directionalities according to exemplary embodiments. As described above with reference to Table 3, each of intra prediction modes according to exemplary embodiments may have directionality of $\tan^{-1}(dy/dx)$ by using a plurality of (dx, dy) parameters.

Referring to FIG. 18A, neighboring pixels A and B on a line 180 that extends from a current pixel P in a current coding unit, which is to be predicted, at an angle of $\tan^{-1}(dy/dx)$ determined by a value of a (dx, dy) parameter according to a mode, shown in Table 3, may be used as predictors of the current pixel P. In this case, the neighboring pixels A and B may be pixels that have been encoded and restored, and belong to previous coding units located above and to the left side of the current coding unit. Also, when the line 180 does not pass along neighboring pixels on locations each having an integral value but passes between these neighboring pixels, neighboring pixels closer to the line 180 may be used as predictors of the current pixel P. If two pixels that meet the line 180, e.g., the neighboring pixel A located above the current pixel P and the neighboring pixel B located to the left side of the current pixel P, are present, an average of pixel values of the neighboring pixels A and B may be used as a predictor of the current pixel P. Otherwise, if a product of values of the dx and dy parameters is a positive value, the neighboring pixel A may be used, and if the product of the values of the dx and dy parameters is a negative value, the neighboring pixel B may be used.

FIGS. 18B and 18C are reference diagrams for explaining a process of generating a predictor when the extended line 180 of FIG. 18A passes between, not through, neighboring pixels of integer locations.

Referring to FIG. 18B, if the extended line 180 having an angle of tan−1(dy/dx) that is determined according to (dx, dy) of each mode passes between a neighboring pixel A 181 and a neighboring pixel B 182 of integer locations, a weighted average value considering a distance between an intersection of the extended line 180 and the neighboring pixels A 181 and B 182 close to the extended line 180 may be used as a predictor as described above. For example, if a distance between the neighboring pixel A 181 and the intersection of the extended line 180 having the angle of tan−1(dy/dx) is f, and a distance between the neighboring pixel B 182 and the intersection of the extended line 180 is g, a predictor for the current pixel P may be obtained as (A*g+B*f)/(f+g). Here, f and g may be each a normalized distance using an integer. If software or hardware is used, the predictor for the current pixel P may be obtained by shift operation as (g*A+f*B+2)>>2. As shown in FIG. 18B, if the extended line 180 passes through a first quarter close to the neighboring pixel A 181 from among four parts obtained by quartering a distance between the neighboring pixel A 181 and the neighboring pixel B 182 of the integer locations, the predictor for the current pixel P may be acquired as (3*A+B)/4. Such operation may be performed by shift operation considering rounding-off to a nearest integer like (3*A+B+2)>>2.

Meanwhile, if the extended line 180 having the angle of tan−1(dy/dx) that is determined according to (dx, dy) of each mode passes between the neighboring pixel A 181 and the neighboring pixel B 182 of the integer locations, a section between the neighboring pixel A 181 and the neighboring pixel B 182 may be divided into a predetermined number of areas, and a weighted average value considering a distance between an intersection and the neighboring pixel A 181 and the neighboring pixel B 182 in each divided area may be used as a prediction value. For example, referring to FIG. 18C, a section between the neighboring pixel A 181 and the neighboring pixel B 182 may be divided into five sections P1 through P5 as shown in FIG. 18C, a representative weighted average value considering a distance between an intersection and the neighboring pixel A 181 and the neighboring pixel B 182 in each section may be determined, and the representative weighted average value may be used as a predictor for the current pixel P. In detail, if the extended line 180 passes through the section P1, a value of the neighboring pixel A may be determined as a predictor for the current pixel P. If the extended line 180 passes through the section P2, a weighted average value (3*A+1*B+2)>>2 considering a distance between the neighboring pixels A and B and a middle point of the section P2 may be determined as a predictor for the current pixel P. If the extended line 180 passes through the section P3, a weighted average value (2*A+2*B+2)>>2 considering a distance between the neighboring pixels A and B and a middle point of the section P3 may be determined as a predictor for the current pixel P. If the extended line 180 passes through the section P4, a weighted average value (1*A+3*B+2)>>2 considering a distance between the neighboring pixels A and B and a middle point of the section P4 may be determined as a predictor for the current pixel P. If the extended line 180 passes through the section P5, a value of the neighboring pixel B may be determined as a predictor for the current pixel P.

Also, if two neighboring pixels, that is, the neighboring pixel A on the up side and the neighboring pixel B on the left side meet the extended line 180 as shown in FIG. 18A, an average value of the neighboring pixel A and the neighboring pixel B may be used as a predictor for the current pixel P, or if (dx*dy) is a positive value, the neighboring pixel A on the up side may be used, and if (dx*dy) is a negative value, the neighboring pixel B on the left side may be used.

The intra prediction modes having various directionalities shown in Table 3 may be predetermined by an encoding side and a decoding side, and only an index of an intra prediction mode of each coding unit may be transmitted.

Figure 19:
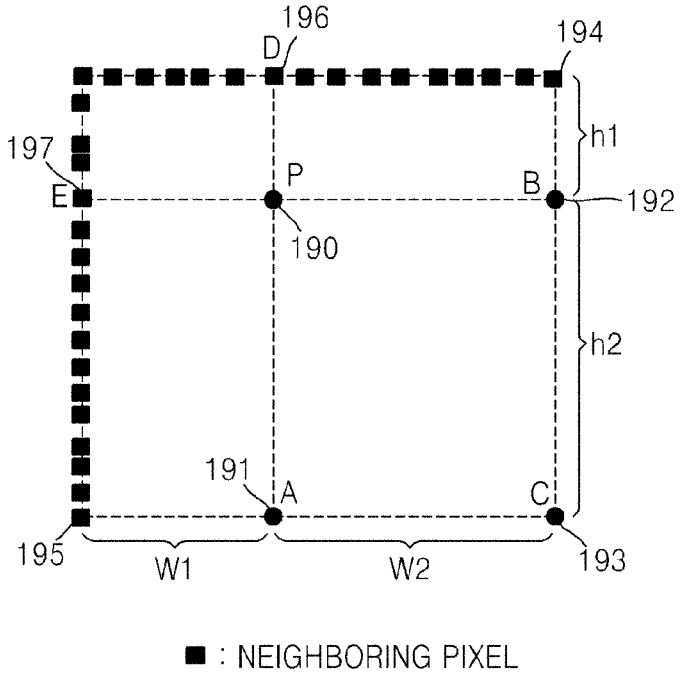
FIG. 19 is a reference diagram for explaining a bi-linear mode according to an exemplary embodiment.

FIG. 19 is a reference diagram for explaining a bi-linear mode according to an exemplary embodiment. Referring to FIG. 19, in the bi-linear mode, a geometric average is calculated by considering a value of a current pixel P 190 in a current coding unit, which is to be predicted, values of pixels on upper, lower, left, and right boundaries of the current coding unit, and the distances between the current pixel P 190 and the upper, lower, left, and right boundaries of the current coding unit, and is then used as a predictor of the current pixel P 190. For example, in the bi-linear mode, a geometric average calculated using a virtual pixel A 191, a virtual pixel B 192, a pixel D 196, and a pixel E 197 located to the upper, lower, left, and right sides of the current pixel P 190, and the distances between the current pixel P 190 and the upper, lower, left, and right boundaries of the current coding unit, is used as a predictor of the current pixel P 190. Since the bi-linear mode is one of intra prediction modes, neighboring pixels that have been encoded and restored and belong to previous coding units are used as reference pixels for prediction. Thus, pixel values in the current coding unit are not used but virtual pixel values calculated using neighboring pixels located to the upper and left sides of the current coding unit are used as the pixel A 191 and the pixel B 192.

Specifically, first, a value of a virtual pixel C 193 on a lower rightmost point of the current coding unit is calculated by calculating an average of values of a neighboring pixel (right-up pixel) 194 on an upper rightmost point of the current coding unit and a neighboring pixel (left-down pixel) 195 on a lower leftmost point of the current coding unit, as expressed in the following equation:

$$C=0.5(\text{LeftDownPixel}+\text{RightUpPixel}) \tag{4}$$

The virtual pixel C 193 may be obtained by shifting operation as The Equation 4 may be the predictor for the current pixel P may be obtained by shift operation as C=0.5(LeftDownPixel+RightUpPixel+1)>>1.

Next, a value of the virtual pixel A 191 located on a lowermost boundary of the current coding unit when the current pixel P 190 is extended downward by considering the distance W1 between the current pixel P 190 and the left boundary of the current coding unit and the distance W2 between the current pixel P 190 and the right boundary of the current coding unit, is calculated by using the following equation:

$$A=(C*W1+\text{LeftDownPixel}*W2)/(W1+W2)$$

$$A=(C*W1+\text{LeftDownPixel}*W2+((W1+W2)/2))/(W1+W2) \tag{5}$$

When a value of W1+W2 in Equation 5 is a power of 2, like 2^n, A=(C*W1+LeftDownPixel*W2+((W1+W2)/2))/(W1+W2) may be calculated by shift operation as A=(C*W1+LeftDownPixel*W2+2^(n−1))>>n without division.

Similarly, a value of the virtual pixel B 192 located on a rightmost boundary of the current coding unit when the current pixel P 190 is extended in the right direction by considering the distance h1 between the current pixel P 190 and the upper boundary of the current coding unit and the distance h2 between the current pixel P 190 and the lower boundary of the current coding unit, is calculated by using the following equation:

$$B=(C*h1+\text{RightUpPixel}*h2)/(h1+h2)$$

$$B=(C*h1+\text{RightUpPixel}*h2+((h1+h2)/2))/(h1+h2) \tag{6}$$

When a value of h1+h2 in Equation 6 is a power of 2, like 2^m, B=(C*h1+RightUpPixel*h2+((h1+h2)/2))/(h1+h2) may be calculated by shift operation as B=(C*h1+RightUpPixel*h2+2^(m−1))>>m without division.

Once the values of the virtual pixel B 192 on the right border and the virtual pixel A 191 on the down border of the current pixel P 190 are determined by using Equations (4) through (6), a predictor for the current pixel P 190 may be determined by using an average value of A+B+D+E. In detail, a weighted average value considering a distance between the current pixel P 190 and the virtual pixel A 191, the virtual pixel B 192, the pixel D 196, and the pixel E 197 or an average value of A+B+D+E may be used as a predictor for the current pixel P 190. For example, if a weighted average value is used and the size of block is 16×16, a predictor for the current pixel P may be obtained as (h1*A+h2*D+W1*B+W2*E+16)>>5. Such bilinear prediction is applied to all pixels in the current coding unit, and a prediction coding unit of the current coding unit in a bilinear prediction mode is generated.

According to an exemplary embodiment, prediction encoding is performed according to various intra prediction modes determined according to the size of a coding unit, thereby allowing efficient video compression based on characteristics of an image.

Meanwhile, as described with reference to FIGS. 18A through 18C, if a predictor for the current pixel P is generated by using neighboring pixels on or close to the extended line 180, the extended line 180 has actually a directivity of tan−1(dy/dx). In order to calculate the directivity, since division (dy/dx) is necessary, calculation is made down to decimal places when hardware or software is used, thereby increasing the amount of calculation. Accordingly, a process of setting dx and dy is used in order to reduce the amount of calculation when a prediction direction for selecting neighboring pixels to be used as reference pixels about a pixel in a coding unit is set by using dx, and dy parameters in a similar manner to that described with reference to Table 3.

Figure 27:
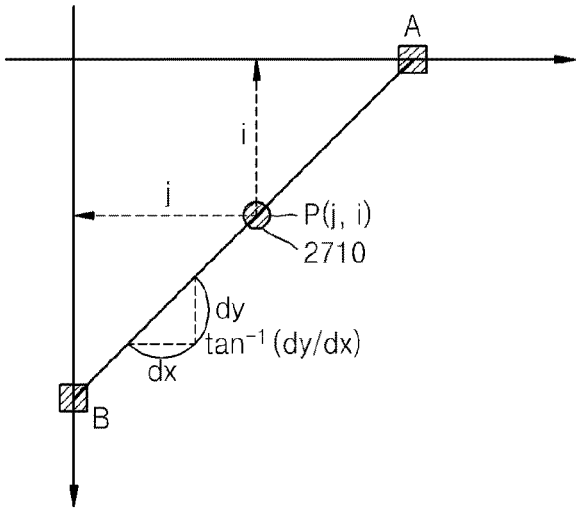
FIG. 27 is a diagram for explaining a relationship between a current pixel and neighboring pixels located on an extended line having a directivity of (dx, dy)

FIG. 27 is a diagram for explaining a relationship between a current pixel and neighboring pixels located on an extended line having a directivity of (dy/dx), according to an exemplary embodiment.

Referring to FIG. 27, it is assumed that a location of the current pixel P is P(j,i), and an up neighboring pixel and a left neighboring pixel B located on an extended line 2710 having a directivity, that is, a gradient, of tan−1(dy/dx) and passing through the current pixel P are respectively A and B. When it is assumed that locations of up neighboring pixels correspond to an X-axis on a coordinate plane, and locations of left neighboring pixels correspond to a y-axis on the coordinate plate, the up neighboring pixel A is located at (j+i*dx/dy,0), and the left neighboring pixel B is located at (0,i+j*dy/dx). Accordingly, in order to determine any one of the up neighboring pixel A and the left neighboring pixel B for predicting the current pixel P, division, such as dx/dy or dy/dx, is required. Such division is very complex as described above, thereby reducing a calculation speed of software or hardware.

Accordingly, a value of any one of dx and dy representing a directivity of a prediction mode for determining neighboring pixels may be determined to be a power of 2. That is, when n and m are integers, dx and dy may be 2^n and 2^m, respectively.

Referring to FIG. 27, if the left neighboring pixel B is used as a predictor for the current pixel P and dx has a value of 2^n, j*dy/dx necessary to determine (0,i+j*dy/dx) that is a location of the left neighboring pixel B becomes (j*dy/(2^n)), and division using such a power of 2 is easily obtained through shift operation as (j*dy)>>n, thereby reducing the amount of calculation.

Likewise, if the up neighboring pixel A is used as a predictor for the current pixel P and dy has a value of 2^m, i*dx/dy necessary to determine (j+i*dx/dy,0) that is a location of the up neighboring pixel A becomes (i*dx)/(2^m), and division using such a power of 2 is easily obtained through shift operation as (i*dx)>>m.

Figure 28:
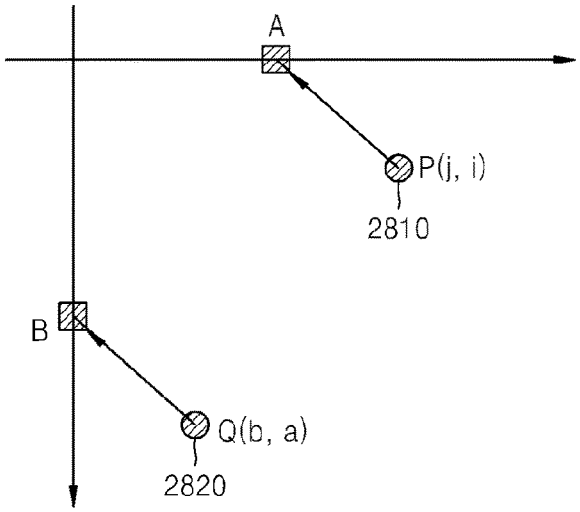
FIG. 28 is a diagram for explaining a change in a neighboring pixel located on an extended line having a directivity of (dx, dy) according to a location of a current pixel, according to an exemplary embodiment.

FIG. 28 is a diagram for explaining a change in a neighboring pixel located on an extended line having a directivity of (dx,dy) according to a location of a current pixel, according to an exemplary embodiment.

As a neighboring pixel necessary for prediction according to a location of a current pixel, any one of an up neighboring pixel and a left neighboring pixel is selected.

Referring to FIG. 28, when a current pixel 2810 is P(j,i) and is predicted by using a neighboring pixel located in a prediction direction, an up pixel A is used to predict the current pixel P 2810. When the current pixel 2810 is Q(b,a), a left pixel B is used to predict the current pixel Q 2820.

Figure 24:
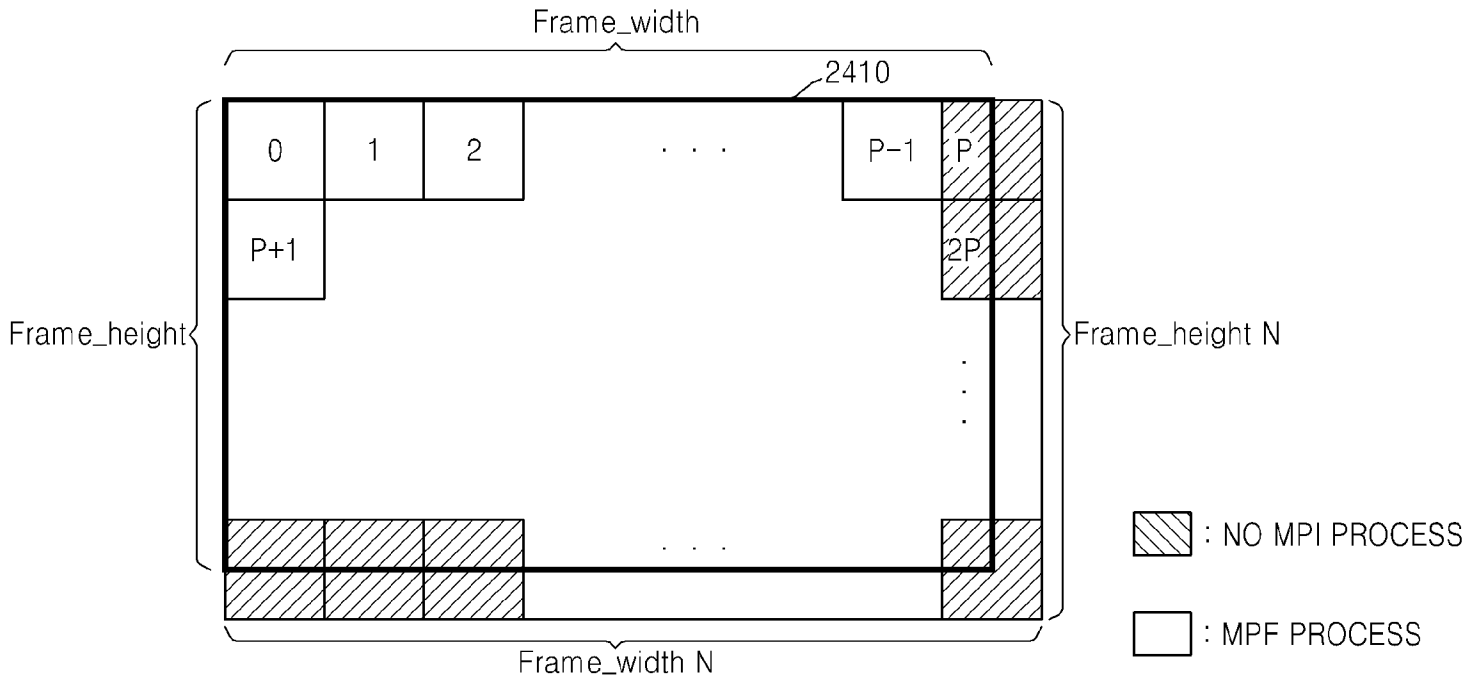
FIG. 24 is a reference diagram for explaining an indexing process for post-processing a coding unit according to an exemplary embodiment.

If only a dy component of a y-axis direction from among (dx, dy) representing a prediction direction has a power of 2 like 2^m, while the up pixel A in FIG. 24 may be determined through shift operation without division such as (j+(i*dx)>>m, 0), the left pixel B requires division such as (0, a+b*2^m/dx). Accordingly, in order to exclude division when a predictor is generated for all pixels of a current block, all of dx and dy may have a type of power of 2.

Figure 29:
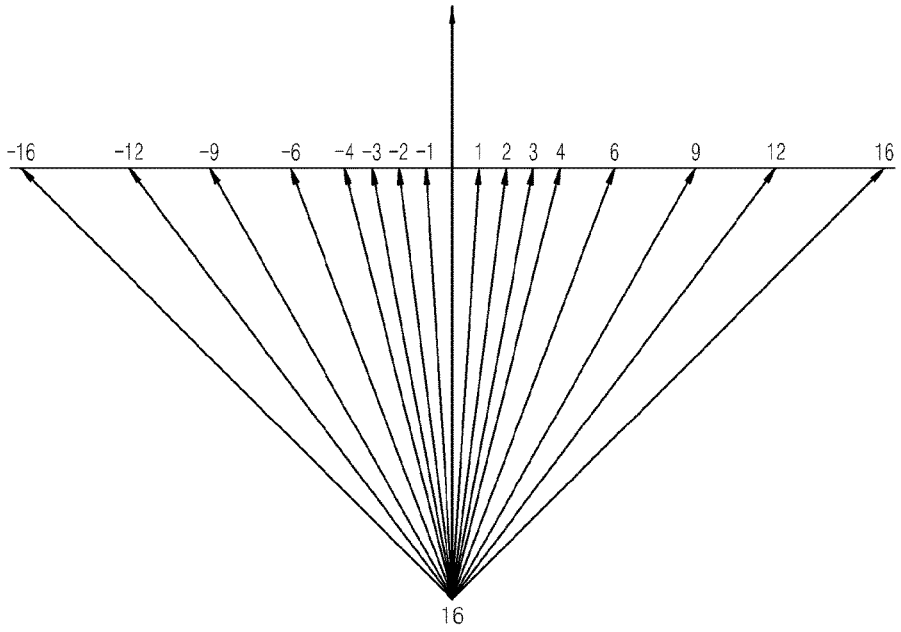
FIGS. 29 and 30 are diagrams for explaining a method of determining an intra prediction mode direction, according to exemplary embodiments.
Figure 30:
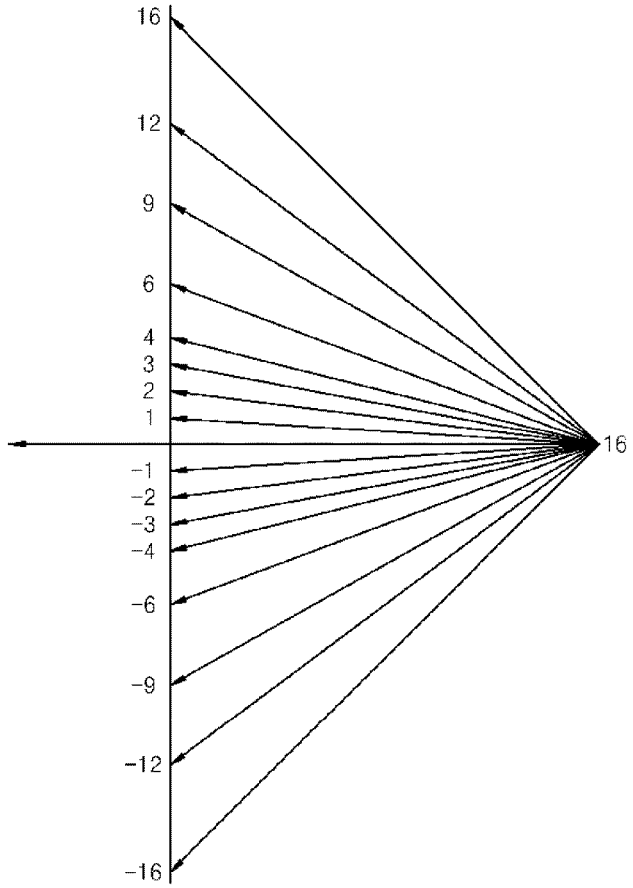

FIGS. 29 and 30 are diagrams for explaining a method of determining an intra prediction mode direction, according to exemplary embodiments.

In general, there are many cases where linear patterns shown in an image or a video signal are vertical or horizontal. Accordingly, when intra prediction modes having various directivities are defined by using parameters dx and dy, image coding efficiency may be improved by defining values dx and dy as follows.

In detail, if dy has a fixed value of 2^m, an absolute value of dx may be set so that a distance between prediction directions close to a vertical direction is narrow, and a distance between prediction modes closer to a horizontal direction is wider. For example, referring to FIG. 29, if dy has a value of 2^4, that is, 16, a value of dx may be set to be 1,2,3,4,6,9,12, 16,0,−1,−2,−3,−4,−6,−9,−12, and −16 so that a distance between prediction directions close to a vertical direction is narrow and a distance between prediction modes closer to a horizontal direction is wider.

Likewise, if dx has a fixed value of 2^n, an absolute value of dy may be set so that a distance between prediction directions close to a horizontal direction is narrow and a distance between prediction modes closer to a vertical direction is wider. For example, referring to FIG. 30, if dx has a value of 2^4, that is, 16, a value of dy may be set to be 1,2,3,4,6,9,12, 16,0,−1,−2,−3,−4,−6,−9,−12, and −16 so that a distance between prediction directions close to a horizontal direction is narrow and a distance between prediction modes closer to a vertical direction is wider.

Also, when one of values of dx and dy is fixed, the remaining value may be set to be increased according to a prediction mode. For example, if dy is fixed, a distance between dx may be set to be increased by a predetermined value. Also, an angle of a horizontal direction and a vertical direction may be divided in predetermined units, and such an increased amount may be set in each of the divided angles. For example, if dy is fixed, a value of dx may be set to have an increased amount of a in a section less than 15 degrees, an increased amount of b in a section between 15 degrees and 30 degrees, and an increased width of c in a section greater than 30 degrees. In this case, in order to have such a shape as shown in FIG. 27, the value of dx may be set to satisfy a relationship of a<b<c.

For example, prediction modes described with reference to FIGS. 27 through 30 may be defined as a prediction mode having a directivity of tan−1(dy/dx) by using (dx, dy) as shown in Tables 4 through 6.

TABLE 4

| dx | Dy | dx | dy | dx | dy |
|---|---|---|---|---|---|
| −32 | 32 | 21 | 32 | 32 | 13 |
| −26 | 32 | 26 | 32 | 32 | 17 |
| −21 | 32 | 32 | 32 | 32 | 21 |
| −17 | 32 | 32 | −26 | 32 | 26 |
| −13 | 32 | 32 | −21 | 32 | 32 |
| −9 | 32 | 32 | −17 | | |
| −5 | 32 | 32 | −13 | | |
| −2 | 32 | 32 | −9 | | |
| 0 | 32 | 32 | −5 | | |
| 2 | 32 | 32 | −2 | | |
| 5 | 32 | 32 | 0 | | |
| 9 | 32 | 32 | 2 | | |
| 13 | 32 | 32 | 5 | | |
| 17 | 32 | 32 | 9 | | |

TABLE 5

| dx | Dy | dx | dy | dx | Dy |
|---|---|---|---|---|---|
| −32 | 32 | 19 | 32 | 32 | 10 |
| −25 | 32 | 25 | 32 | 32 | 14 |
| 9 | 32 | 32 | 32 | 32 | 19 |
| −14 | 32 | 32 | −25 | 32 | 25 |
| −10 | 32 | 32 | −19 | 32 | 32 |
| −6 | 32 | 32 | −14 | | |
| −3 | 32 | 32 | −10 | | |
| −1 | 32 | 32 | −6 | | |

TABLE 5-continued

| dx | Dy | dx | dy | dx | Dy |
|---|---|---|---|---|---|
| 0 | 32 | 32 | −3 | | |
| 1 | 32 | 32 | −1 | | |
| 3 | 32 | 32 | 0 | | |
| 6 | 32 | 32 | 1 | | |
| 10 | 32 | 32 | 3 | | |
| 14 | 32 | 32 | 6 | | |

TABLE 6

| dx | Dy | dx | dy | dx | dy |
|---|---|---|---|---|---|
| −32 | 32 | 23 | 32 | 32 | 15 |
| −27 | 32 | 27 | 32 | 32 | 19 |
| −23 | 32 | 32 | 32 | 32 | 23 |
| −19 | 32 | 32 | −27 | 32 | 27 |
| −15 | 32 | 32 | −23 | 32 | 32 |
| −11 | 32 | 32 | −19 | | |
| −7 | 32 | 32 | −15 | | |
| −3 | 32 | 32 | −11 | | |
| 0 | 32 | 32 | −7 | | |
| 3 | 32 | 32 | −3 | | |
| 7 | 32 | 32 | 0 | | |
| 11 | 32 | 32 | 3 | | |
| 15 | 32 | 32 | 7 | | |
| 19 | 32 | 32 | 11 | | |

As described above, a predicted coding unit produced using an intra prediction mode determined according to the size of a current coding unit by the predictor 1410 of the intra prediction apparatus 1400 of FIG. 14, has a directionality according to the intra prediction mode. The directionality in the predicted coding unit may lead to an improvement in prediction efficiency when pixels of the current coding unit that is to be predicted have a predetermined directionality but may lead to a degradation in prediction efficiency when these pixels do not have a predetermined directionality. Thus, the post-processor 1420 may improve prediction efficiency by producing a new predicted coding unit by changing values of pixels in the predicted coding unit by using the pixels in the predicted coding unit and at least one neighboring pixel, as post-processing for the predicted coding unit produced through intra prediction. In this case, the post-processor 1420 does not perform post-processing on all predicted coding units but may perform post-processing only when the determiner 1415 determines that a current predicted coding unit does not include a portion located outside a boundary of a picture, that is, when an index MPI_PredMode is not 0.

FIG. 24 is a reference diagram for explaining an indexing process for post-processing a coding unit according to an exemplary embodiment. Referring to FIG. 24, if a current picture 2410 is divided and encoded into coding units each having a predetermined size, and a width Frame_width of the current picture 2410 is not a multiple of a horizontal length of each of the coding units or a height Frame_height of the current picture 2410 is not a multiple of a vertical length of each of the coding units, then some portion of the coding units (which are indicated with slant lines) extend over right and lower boundaries of the current picture 2410 as illustrated in FIG. 24. The determiner 1415 of FIG. 14 may set a predetermined index MPI_PredMode for the coding units extending over a boundary of the current picture to be 0, so that the post-processor 1420 of FIG. 14 may skip post-processing of these coding units.

A reason why post-processing is not performed when a current predicted coding unit has a portion located outside a boundary of a current coding unit, is because neighboring pixels of each pixel are used for post-processing and pixels in the current predicted coding unit lack neighboring pixels. Even if post-processing is performed by producing neighboring pixels through padding or extrapolation, prediction efficiency is not high because the produced neighboring pixels are originally non-existent pixels.

Figure 25:
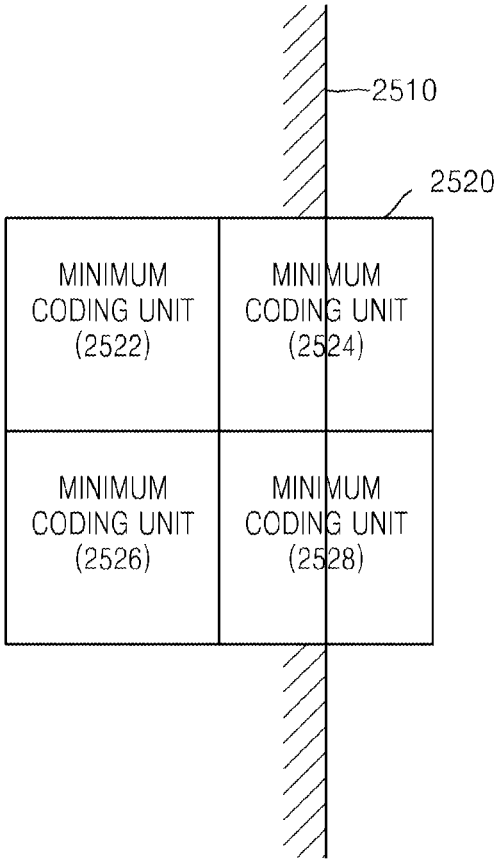
FIG. 25 is a reference diagram for explaining an indexing process for post-processing a coding unit according to another exemplary embodiment.

FIG. 25 is a reference diagram for explaining an indexing process for post-processing a coding unit according to another exemplary embodiment. Referring to FIG. 24, if the determiner 1415 of FIG. 14 determines that a coding unit 2520 extends over a boundary 2510 of a picture, then the coding unit 2520 may be split into deeper coding units of a depth that is deeper than that of the coding unit 2520, and whether each of the deeper coding units has a portion located outside a boundary of the picture may be determined, rather than not post-processing the entire coding unit 2520. Such a splitting process may be repeatedly performed until coding units, e.g., coding units 2524 and 2528, which extend over the boundary 2510 of the picture are minimum coding units and cannot thus be split any further, that is, until a current depth is a maximum depth. Referring to FIG. 25, an index MPI_PredMode for the minimum coding units 2524 and 2528 located outside the boundary 2510 is set to 0 so that the minimum coding units 2524 and 2528 may not be post-processed, and an index MPI_PredMode for minimum coding units 2522 and 2526 located within the boundary 2510 is set to be 1 so that the minimum coding units 2522 and 2526 may be post-processed.

A method of post-processing a predicted coding unit by the post-processor 1420 of FIG. 14 according to an exemplary embodiment, will now be described.

If the determiner 1415 of FIG. 14 determines that a current coding unit does not include a portion located outside a boundary of a picture, then the post-processor 1420 produces a second predicted coding unit by changing values of pixels constituting a first predicted coding unit produced by the predictor 140 of FIG. 14 by performing post-processing using the pixels of the first predicted coding unit and at least one neighboring pixel. The predictor 1410 produces the first predicted coding unit by using an intra prediction mode determined according to a size of the current coding unit, as described above.

Figure 20:
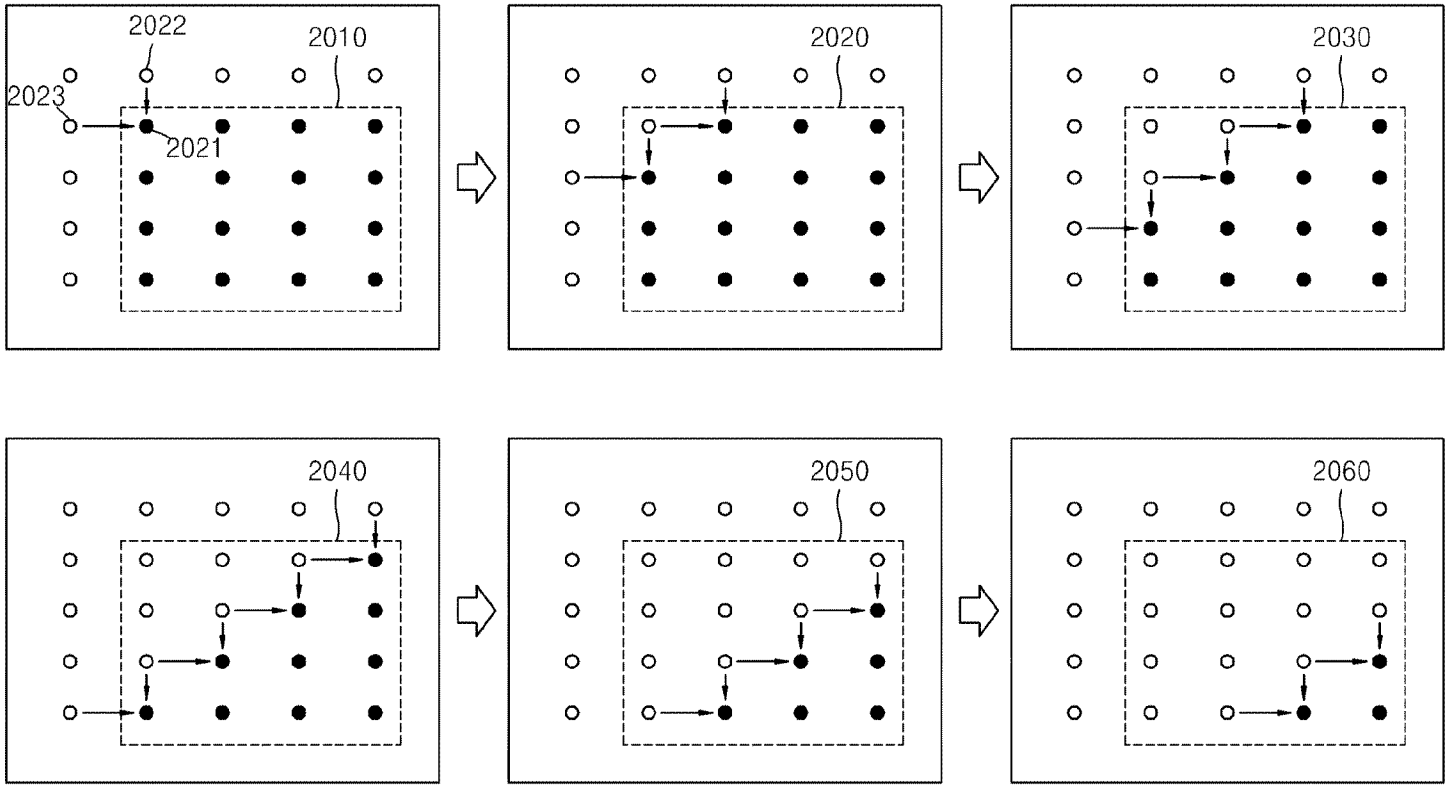
FIG. 20 is a reference diagram for explaining post-processing of a first predicted coding unit, according to an exemplary embodiment.

FIG. 20 is a reference diagram for explaining post-processing of a first predicted coding unit, according to an exemplary embodiment. In FIG. 20, reference numerals 2010 to 2060 illustrate a process of changing values of pixels in the first predicted coding unit by the post-processor 1420 in chronological order.

Referring to FIG. 20, the post-processor 1420 of FIG. 14 changes values of pixels in the first predicted coding unit 2010 by calculating a weighted average of values of a pixel in the first predicted coding unit 2010, which is to be changed, and neighboring pixels of the pixel. For example, referring to FIG. 20, if a value of a pixel 2021 of the first predicted coding unit 2010, which is to be changed, is f[1][1], a value of a pixel 2022 located above the pixel 2021 is f[0][1], a pixel 2023 located to the left side of the pixel 2021 is f[1][0], and a result of changing the value f[1][1] of the pixel 2021 is f[1][1], then f[1][1] may be calculated using the following equation:

$$f[1][1] = (f[0][1] + f[1][0] + (f[1][1] << 1) + 2) >> 2 \quad (7)$$

-continued $$f'[1][1] = \frac{f[0][1] + f[1][0] + 2 * f[1][1]}{4}$$

As illustrated in FIG. 20, the post-processor 1420 changes values of pixels included in the first predicted coding unit 2010 by calculating a weighted average of the values of each pixel of the first predicted coding unit and pixels located above and to the left side of the pixel in a direction from an upper leftmost point of the first predicted coding unit to a lower rightmost point of the first predicted coding unit. However, such a post-processing operation according to another exemplary embodiment is not limited thereto, and may be sequentially performed on the pixels of the first predicted coding unit in a direction from a upper rightmost point of the first predicted coding unit to a lower leftmost point of the first predicted coding unit or a direction from the lower rightmost point of the first predicted coding unit to the upper leftmost point of the first predicted coding unit. For example, if the post-processor 1420 changes the values of the pixels of the first predicted coding unit in the direction from the upper rightmost point to the lower leftmost point unlike as illustrated in FIG. 20, then the values of the pixels of the first predicted coding unit are changed by calculating a weighted average of the values of each of the pixels of the first predicted coding unit and pixels located below and to the right side of the first predicted coding unit.

Figure 21:
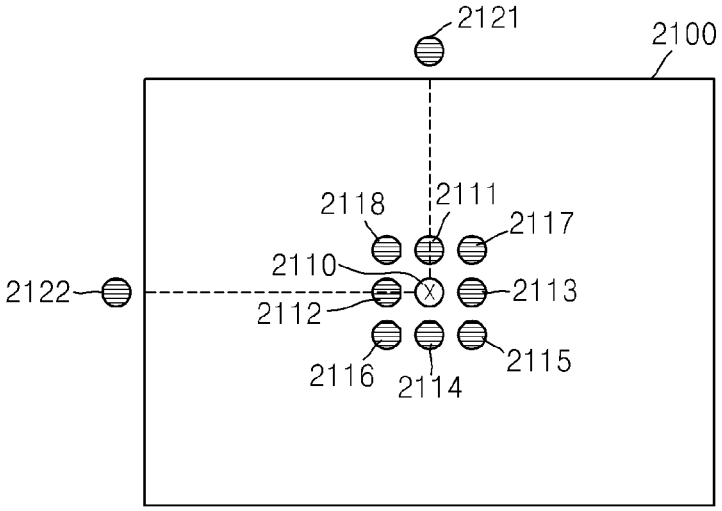
FIG. 21 is a reference diagram for explaining an operation of a post-processor according to an exemplary embodiment.
Figure 22:
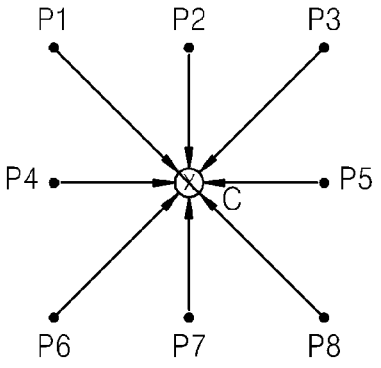
FIG. 22 is a reference diagram for explaining neighboring pixels to be used by a post-processor according to an exemplary embodiment.

FIG. 21 is a reference diagram for explaining an operation of the post-processor 1420 of FIG. 14 according to an exemplary embodiment. FIG. 22 is a reference diagram for explaining neighboring pixels to be used by a post-processor according to an exemplary embodiment. In FIG. 21, reference numeral 2110 denotes a first pixel of a first predicted coding unit 2100, which is to be changed, and reference numerals 2111 to 2118 denote neighboring pixels of the first pixel 2110.

In the current exemplary embodiment (first exemplary embodiment), neighboring pixels of the first pixel 2110 are not limited to those located above and to the left side of the first predicted coding unit, unlike as illustrated in FIG. 20. Referring to FIG. 21, the post-processor 1420 may post-process the first pixel 2110 by using a predetermined number of neighboring pixels selected from among the neighboring pixels 2111 to 2118. That is, referring to FIG. 22, a predetermined number of pixels are selected from among neighboring pixels P1 to P8 of a first pixel c of a current coding unit, and a value of the first pixel c is changed by performing a predetermined operation on the selected neighboring pixels and the first pixel c. For example, if the size of the first predicted coding unit 2100 is m×n, a value of the first pixel 2110, which is to be changed and is located at an $i^{th}$ column and a $i^{th}$ row of the first predicted coding unit 2100, is f[i][j], values of n pixels selected from among the neighboring pixels 2111 to 2118 of the first pixel 2110 so as to post-process the first pixel 2110 are f1 to fn, respectively, then the post-processor 1420 changes the value of the first pixel 2110 from f[i][j] to f[i][j] by using the following equation. Here, m denotes a positive integer, n is 2 or 3, i denotes an integer from 0 to m−1, and j denotes an integer from 0 to n−1.

$$f'[i][j] = \frac{f1 + f2 + 2 \times f[i][j] + 2}{4} (n = 2) \quad (8)$$

-continued $$f'[i][j] = \frac{f1 + f2 + f3 + f[i][j]}{4} (n = 3)$$

The post-processor 1420 produces a second predicted coding unit by changing values of all pixels included in the first predicted coding unit 2100 by using Equation (8). In Equation (8), three neighboring pixels are used, but another exemplary embodiment is not limited thereto and the post-processor 1420 may perform post-processing by using four or more neighboring pixels.

According to a second exemplary embodiment, the post-processor 1420 produces a second predicted coding unit by changing the value of each pixel of the first predicted coding unit 2100 by using a weighted harmonic average of the values of a pixel of the first predicted coding unit 2100, which is to be changed, and neighboring pixels of the pixel.

For example, the post-processor 1420 changes the value of a pixel at the $i^{th}$ column and the $j^{th}$ row of the first predicted coding unit 2100 from f[i][j] to f[i][j] by using neighboring pixels located above and to the left side of the pixel, as shown in the following equation:

$$f'[i][j] = \frac{\alpha + \beta + \gamma}{\frac{\alpha}{f[i-1][j]} + \frac{\beta}{f[i][j-1]} + \frac{\gamma}{f[i][j]}} \quad (9)$$

wherein α, β, and γ denote positive integers, and for example, α=2, β=2, and γ=1.

According to a third exemplary embodiment, the post-processor 1420 produces a second predicted coding unit by changing the value of each pixel of the first predicted coding unit 2100 by using a weighted geometric average of values of a pixel of the first predicted coding unit 2100, which is to be changed, and neighboring pixels of the pixel.

For example, the post-processor 1420 changes the value of a pixel at the $i^{th}$ column and the $j^{th}$ row of the first predicted coding unit 2100 from f[i][j] to f[i][j] by using neighboring pixels located above and to the left side of the pixel, as shown in the following equation:

$$f'[i][j] = (f[i-1][j]^{\alpha} * f[i][j-1]^{\beta} * f[i][j]^{\gamma})^{\frac{1}{(\alpha+\beta+\gamma)}}, \quad (10)$$

wherein α, β, and γ denote positive integers, and for example, α=1, β=1, and γ=2. In Equation (8) to (10), a relative large weight is assigned to the value f[i][j] of the pixel that is to be changed.

As described above, in the first to third exemplary embodiments, the post-processor 1420 may perform post-processing by using not only neighboring pixels located above and to the left side of a pixel that is to be changed, but also a predetermined number of neighboring pixels selected from among the neighboring pixels 2111 to 2118 as illustrated in FIG. 21.

According to a fourth exemplary embodiment, the post-processor 1420 produces a second predicted coding unit by changing the value of each pixel in the first predicted coding unit by using an average of the values of a pixel in the first predicted coding unit, which is to be changed, and one selected from among neighboring pixels of the pixel.

For example, the post-processor 1420 changes the value of a pixel at the $i^{th}$ column and the $j^{th}$ row of the first predicted coding unit 2100 from f[i][j] to f[i][j] by using neighboring pixels located above the pixel, as shown in the following equation:

$$f[i][j]=(f[i-1][j]+f[i][j-1]+1)>>1 \quad (11)$$

Similarly, according to a fifth exemplary embodiment, the post-processor 1420 produces a second predicted coding unit by changing the value of each pixel in the first predicted coding unit by using an average of the values of a pixel in the first predicted coding unit, which is to be changed, and neighboring pixels located to the left side of the pixel.

In other words, the post-processor 1420 changes the value of a pixel at the $i^{th}$ column and the $j^{th}$ row of the first predicted coding unit 2100 from f[i][j] to f[i][j], as shown in the following equation:

$$f[i][j]=(f[i-1][j]+f[i][j+1)>>1 \quad (12)$$

According to a sixth exemplary embodiment, the post-processor 1420 produces a second predicted coding unit by changing the value of each pixel in the first predicted coding unit by using a median between the values of a pixel of the first predicted coding unit, which is to be changed, and neighboring pixels of the pixel. Referring back to FIG. 21, for example, it is assumed that the value f[i][j] of the first pixel 2110 at the $i^{th}$ column and the $i^{th}$ row of the first predicted coding unit 2100, the value f[i][j−1] of the second pixel 2112, and the value f[i−1][j] of the third pixel 2111 have a relation of f[i][j−1]>f[i−1][j]>f[i][j], in terms of block size. In this case, the post-processor 1420 changes the value f[i][j] of the first pixel 2110 to the median f[i−1][j] among the first to third pixels 2110 to 2112.

In seventh to ninth exemplary embodiments, the post-processor 1420 produces a second predicted coding unit by using previous coding units adjacent to a current coding unit, which have been encoded and restored, rather than by using neighboring pixels of a pixel that is to be changed.

Referring back to FIG. 21, in the seventh exemplary embodiment, the post-processor 1420 changes the value of the first pixel 2110 to f[i][j] by calculating an average of the value of the first pixel 2110 at the $i^{th}$ column and the $j^{th}$ row of the first predicted coding unit 2100 and the value of the pixel 2121 that is located at the same column as the first pixel 2110 and included in a coding unit adjacent to the top of the current coding unit, as shown in the following equation:

$$f[i][j]=(f[i][j]+f[-1][j]+1)>>1 \quad (13),$$

wherein f[−1][j] denotes the value of the pixel 2121.

Similarly, in the eighth exemplary embodiment, the post-processor 1420 changes the value of the first pixel 2110 to f[i][j] by calculating an average of the value of the first pixel 2110 at the $i^{th}$ column and the $j^{th}$ row of the first predicted coding unit 2100 and the value of the pixel 2122 that is located at the same row as the first pixel 2110 and included in a coding unit adjacent to the left side of the current coding unit, as shown in the following equation:

$$f[i][j]=(f[i][j]+f[j][-1]+1)>>1 \quad (14),$$

wherein f[i][−1] denotes the value of the pixel 2122.

In the ninth exemplary embodiment, the post-processor 1420 changes the value of the first pixel 2110 to f[i][j] by calculating a weighted average of the values of the first pixel 2110 at the $i^{th}$ column and the $j^{th}$ row of the first predicted coding unit 2100, the pixel 2121 located at the same column as the first pixel 2110 and included in a coding unit adjacent to the top of the current coding unit, and the pixel 2122 located at the same row as the first pixel 2110 and included in a coding unit adjacent to the left side of the current coding unit, as shown in the following equation:

$$f'[i][j]=((f[i][j]<<1)+f[j][-1]+f[i][j-1]+2)>>2 \quad (15)$$

In a tenth exemplary embodiment, the post-processor 1420 changes the value of the first pixel 2110 of the first predicted coding unit 2100, which is to be changed, from f[i][j] to f[i][j] by using one of the following equations.

$$f'[i][j]=\min(f[i][j]+i,255) \quad (16)$$

$$f'[i][j]\min(f[i][j]+j,255) \quad (17)$$

$$f'[i][j]=\max(f[i][j]-i,0) \quad (18)$$

$$f'[i][j]\max(f[i][j]-j,0) \quad (19)$$

In Equation (16), the pixel values of the first predicted coding unit 2100 are changed to gradually increase from top to bottom, in column units of the first predicted coding unit 2100. In Equation (17), the pixel values of the first predicted coding unit 2100 are changed to gradually increase in a right direction, in row units of the first predicted coding unit 2100. In Equation (18), the pixel values of the first predicted coding unit 2100 are changed to gradually decrease from top to bottom, in column units of the first predicted coding unit 2100. In Equation (19), the pixel values of the first predicted coding unit 2100 are changed to gradually decrease in the right direction, in row units of the first predicted coding unit 2100.

In an eleventh exemplary embodiment, if the value of the first pixel 2110, which is located at the $i^{th}$ column and the $j^{th}$ row of the first predicted coding unit 2100 and is to be changed, is f[i][j], the value of a pixel located at an upper leftmost point of the first predicted coding unit 2100 is f[0][0], the value of a pixel located at the $j^{th}$ column as the first pixel 2110 and at the uppermost point of the first predicted coding unit 2100 is f[0][j], the value of a pixel located at the $i^{th}$ row as the first pixel 2110 and at the leftmost point of the first predicted coding unit is f[i][0], and $$G[i][j]=f[i][0]+f[0][j]-f[0][0],$$

then the post-processor 1420 changes the value of the first pixel 2110 to f[i][j], as shown in the following equation:

$$f'[i][j]=(f[i][j]+G[i][j])/2 \quad (20)$$

Equation (20) is based on a wave equation, in which the value of each pixel in the first predicted coding unit 2100 is changed by calculating the value G[i][j] by setting the values of a pixel on the uppermost point of and a pixel on the leftmost point of the first predicted coding unit 2100 to be boundary conditions so as to smooth the value of each pixel in the first predicted coding unit 2100, and then calculating an average of the values G[i][j] and f[i][j].

Also, if a value of a first pixel at an $x^{th}$ column and an $y^{th}$ row of the first predicted coding unit, which is to be changed, is f[x][y] and values of neighboring pixels located above, below, and to the left and right sides of the first pixel are f[x−1][y], f[x+1][y], f[x][y−1], and f[x][y+1], respectively, then the post-processor 1420 may change the value of the first pixel to f[x][y] by using one of the following shifting operations:

$$f[x,y]=(f[x,y]+f[x-1,y]+f[x,y-1]+f[x,y+1]+2)>>2$$

$$f[x,y]=(f[x,y]+f[x-1,y]+f[x,y-1]+f[x-1,y-1]+2)>>2$$

$$f[x,y]=(2*f[x,y]+f[x+1,y]+f[x,y-1]+2)>>2$$

$$f[x,y]=(2*f[x,y]+f[x-1,y]+f[x,y-1]+2)>>2$$

f[x,y]=(f[x,y]+f[x+1,y]+f[x,y+1]+f[x,y−1]+2)>>2 f[x,y]=(f[x,y]+f[x−1,y]+f[x,y+1]+f[x,y−1]+2)>>2

Also, the post-processor 1420 may produce a median by using the first pixel and neighboring pixels of the first pixel, and change the value of the first pixel by using the median. For example, the value of the first pixel may be changed by setting a median t[x,y] by using an equation: t [x,y]=(2*f [x,y]+f[x−1,y]+f[x,y−1]+2)>>2, f[x,y]=t[x,y]. Similarly, the median t[x,y] between the first pixel and the neighboring pixels may be calculated using an equation: t[x,y]=median (f[x,y],f[x−1,y],f[x,y−1]), and may be determined as a changed value of the first pixel.

Also, the post-processor 1420 may change the value of the first pixel by using the following operation:

```
{
t[x,y] = f[x,y]
for (Int iter=0; iter<iterMax; iter++)
{
laplacian[x,y] = (t[x,y]<<2) − t[x−1,y]− t[x+1,y]− t[x,y−1]− t[x,y+1]
t [x,y] =(α* t [x,y] + laplacian[x,y] )/ α
}
f[x,y] = t[x,y]
}
```

Here, iterMax may be 5, and a may be 16.

Costs of bitstreams containing results of encoding second predicted coding units produced using various post-processing modes according to the above first through eleventh embodiments, respectively, are compared to one another, and then, the post-processing mode having the minimum cost is added to a header of a bitstream from among the various post-processing modes. When the post-processing mode is added to the bistream, it is possible to represent different post-processing modes to be differentiated from one another by using variable-length coding, in which a small number of bits are assigned to a post-processing mode that is most frequently used, based on a distribution of the post-processing mode determined after encoding of a predetermined number of coding units is completed. For example, if a post-processing mode according to the first exemplary embodiment is an optimum operation leading to the minimum cost of most coding units, a minimum number of bits are assigned to an index indicating this post-processing mode so that this post-processing mode may be differentiated from the other post-processing modes.

When a coding unit is split to sub coding units and prediction is performed in the sub coding units, a second predicted coding unit may be produced by applying different post-processing modes to the sub coding units, respectively, or by applying the same post-processing mode to sub coding units belonging to the same coding unit so as to simplify calculation and decrease an overhead rate.

A rate-distortion optimization method may be used as a cost for determining an optimum post-processing mode. Since a video encoding method according to an exemplary embodiment is performed on an intra predicted coding unit used as reference data for another coding unit, a cost may be calculated by allocating a high weight to a distortion, compared to the rate-distortion optimization method. That is, in the rate-distortion optimization method, a cost is calculated, based on a distortion that is the difference between an encoded image and the original image and a bitrate generated, as shown in the following equation:

$$\text{Cost}=\text{distortion}+\text{bit-rate} \tag{21}$$

In contrast, in a video encoding method according to an exemplary embodiment, an optimum post-processing mode is determined by allocating a high weight to a distortion, compared to the rate-distortion optimization method, as shown in the following equation:

$$\text{Cost}=\alpha*\text{distortion}+\text{bit-rate}\ (\alpha \text{ denotes a real number equal to or greater than 2}) \tag{22}$$

Figure 23:
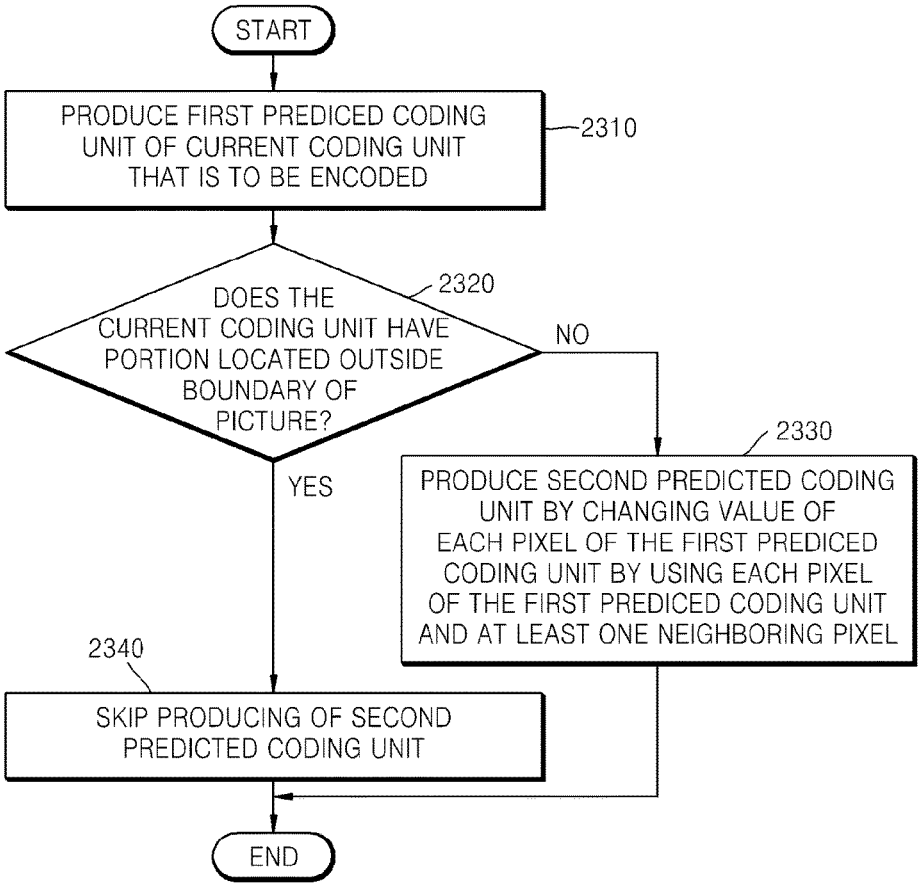
FIG. 23 is a flowchart illustrating a method of encoding video according to an exemplary embodiment.

FIG. 23 is a flowchart illustrating a method of encoding video according to an exemplary embodiment. Referring to FIG. 23, in operation 2310, a first predicted coding unit of a current coding unit that is to be encoded, is produced. The first predicted coding unit is an intra predicted block produced by performing a general intra prediction method, and one of various intra prediction modes having various directionalities, which is determined by the size of a coding unit.

In operation 2320, it is determined whether the current coding unit has a portion located outside a boundary of a current picture. A predetermined index MPI_PredMode may be produced according to the determination result, in such a manner that post-processing for producing a second predicted coding unit will not be performed when the predetermined index MPI_PredMode is 0 and will be performed when the predetermined index MPI_PredMode is 1.

If it is determined in operation 2320 that the current coding unit does not have a portion located outside a boundary of the current picture, then a second predicted coding unit is produced by changing a value of each pixel of the first predicted coding unit by using each pixel of the first predicted coding unit and at least one neighboring pixel, in operation 2330. As described above in the first through eleventh exemplary embodiments regarding an operation of the post-processor 1420, a second predicted coding unit may be produced by changing the value of each pixel in the first predicted coding unit by performing one of various post-processing modes on a pixel of the first predicted coding unit, which is to be changed, and neighboring pixels thereof. Then, a residual block that is the difference between the second predicted coding unit and the current coding unit, is transformed, quantized, and entropy encoded so as to generate a bitstream. Information regarding the post-processing mode used to produce the second predicted coding unit may be added to a predetermined region of the bitstream, so that a decoding apparatus may reproduce the second predicted coding unit of the current coding unit.

If it is determined in operation 2320 that the current coding unit has a portion located outside a boundary of the current picture, then, a second predicted coding unit is not produced, and the first predicted coding unit is directly output as prediction information regarding the current coding unit, in operation 2340. Then, a residual block that is the difference between the first predicted coding unit and the current coding unit, is transformed, quantized, and entropy encoded so as to generate a bitstream.

Figure 26:
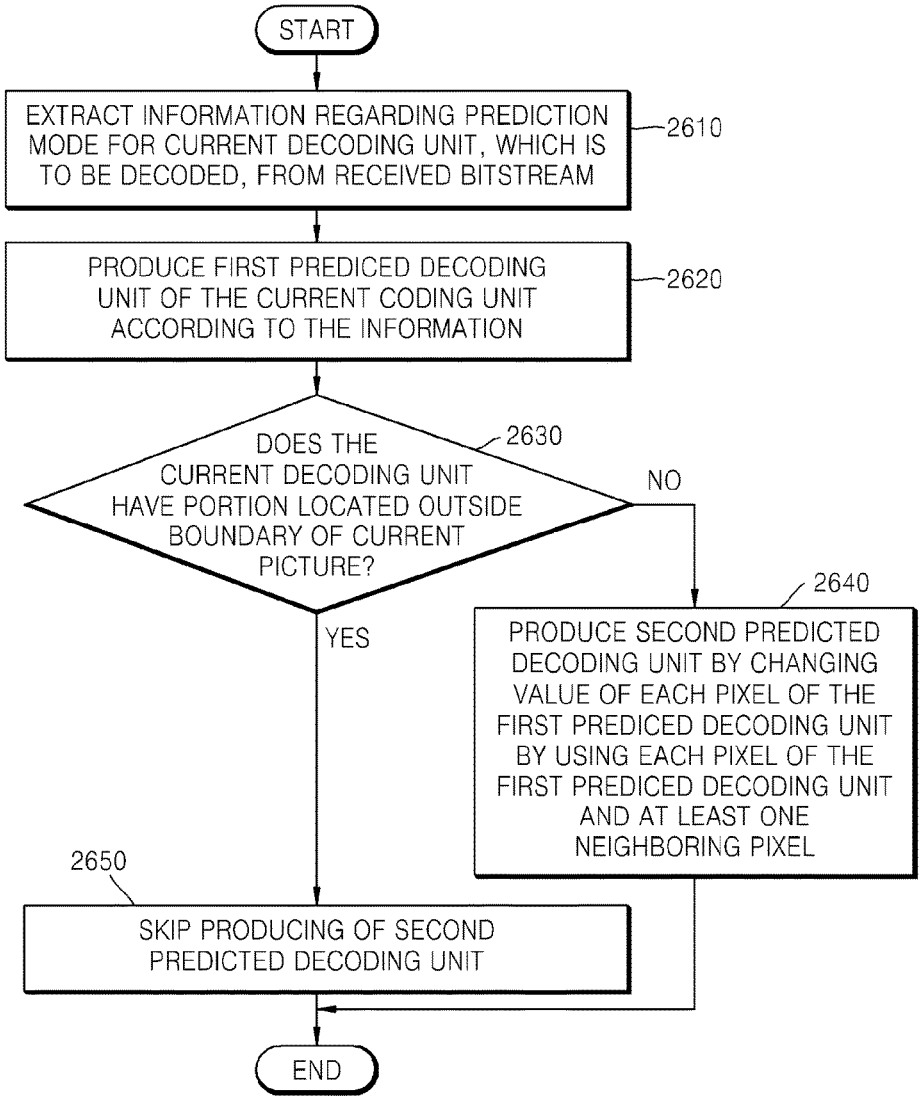
FIG. 26 is a flowchart illustrating a method of decoding video according to an exemplary embodiment.

FIG. 26 is a flowchart illustrating a method of decoding video according to an exemplary embodiment. Referring to FIG. 26, in operation 2610, information regarding a prediction mode related to a current decoding unit that is to be decoded, is extracted from a received bitstream.

In operation 2620, a first predicted decoding unit of the current decoding unit is produced according to the extracted information.

In operation 2630, it is determined whether the current decoding unit has a portion located outside a boundary of a current picture. A predetermined index MPI_PredMode may be produced according to the determination result, in such a manner that post-processing for producing a second predicted decoding unit will not be performed when the predetermined index MPI_PredMode is 0 and will be performed when the predetermined index MPI_PredMode is 1.

If it is determined in operation 2630 that the current decoding unit does not have a portion located outside a boundary of the current picture, a second predicted decoding unit is produced by changing a value of each pixel of the first predicted decoding unit by using each pixel of the first predicted decoding unit and neighboring pixels of each pixel, in operation 2640. As described above in the first through eleventh exemplary embodiments regarding an operation of the post-processor 1420, a second predicted coding unit may be produced by changing the value of each pixel of the first predicted coding unit by using performing one of various post-processing modes on a pixel of the first predicted coding unit, which is to be changed, and neighboring pixels thereof.

If it is determined in operation 2630 that that the current decoding unit has a portion located outside a boundary of the current picture, post-processing for producing a second predicted decoding unit is not performed and the first predicted decoding unit is directly output as prediction information regarding the current decoding unit, in operation 2650. The first predicted decoding unit is combined with a residual block of the current decoding unit, which is extracted from the bitstream, so as to reproduce the current decoding unit.

An exemplary embodiment can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

Exemplary embodiments can also be implemented as computer processors and hardware devices.

While exemplary embodiments have been particularly shown and described above, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of exemplary embodiments but by the following claims, and all differences within the scope will be construed as being included in the present inventive concept.

What is claimed is:

[1. A method of decoding video, the method comprising:

extracting information regarding a prediction mode for a current decoding unit, which is to be decoded, from a received bitstream;

producing a first predicted decoding unit of the current decoding unit, based on the extracted information;

determining whether the current decoding unit includes a portion located outside a boundary of a current picture; and producing a second predicted decoding unit by changing values of pixels of the first predicted decoding unit by using pixels of the first predicted decoding unit and neighboring pixels of the pixels when the current decoding unit does not include the portion located outside the boundary of the current picture, and skipping the producing the second predicted decoding unit when the current decoding unit includes the portion located outside the boundary of the current picture.]

[2. The method of claim 1, wherein the determining whether the current decoding unit includes the portion located outside the boundary of the current picture comprises obtaining index information indicating whether the producing the second predicted decoding unit is to be performed.]

[3. The method of claim 2, wherein:

if the index information has a first predetermined value, the index information indicates that the producing the second predicted decoding unit is not to be performed; and if the index information has a second predetermined value, the index information indicates that the producing the second predicted decoding unit is to be performed.]

[4. An apparatus for decoding video, the apparatus comprising:

an entropy decoder which extracts information regarding a prediction mode for a current decoding unit, which is to be decoded, from a received bitstream;

a predictor which produces a first predicted decoding unit of the current decoding unit, based on the extracted information;

a determiner which determines whether the current decoding unit includes a portion located outside a boundary of a current picture; and a post-processor which produces a second predicted decoding unit by changing values of pixels of the first predicted decoding unit by using the pixels of the first predicted decoding unit and neighboring pixels of the pixels when the current decoding unit does not include the portion located outside the boundary of the current picture, and which skips the producing the second predicted decoding unit when the current decoding unit includes the portion located outside the boundary of the current picture.]

[5. The apparatus of claim 4, wherein the determiner obtains index information indicating whether a process of producing the second predicted decoding unit is to be performed.]

[6. The apparatus of claim 5, wherein:

if the index information has a first predetermined value, the index information indicates that the process of producing the second predicted decoding unit is not to be performed; and if the index information has a second predetermined value, the index information indicates that the process of producing the second predicted decoding unit is to be performed.]

[7. A non-transitory computer readable recording medium having recorded thereon a program code for executing the method of claim 1.]

*8. An apparatus of restoring an encoded block, the apparatus comprising:*

*a processor; and*

*a memory storing a program which causes the processor to:*

*split an image into a plurality of maximum coding units based on information about a size of a maximum coding unit, and determine at least one coding unit included in the maximum coding unit among the*

*plurality of maximum coding units by splitting the maximum coding unit based on split information,*

*extract information regarding a prediction mode of a current block included in the at least one coding unit, from a received bitstream,*

*determine neighboring pixels of the current block used for intra prediction by using available neighboring pixels of the current block when the extracted information indicates the prediction mode of the current block is intra prediction,*

*produce a first prediction value of the current block including a first pixel located on a top border in the current block and a second pixel located on a left border in the current block, by calculating an average value of at least one of the neighboring pixels adjacent to the current block,*

*produce a second prediction value of the first pixel by using a weighted average value of the first prediction value and a pixel value of one neighboring pixel adjacent to the first pixel and located on same column with the first pixel,*

*produce a second prediction value of the second pixel by using a weighted average value of the first prediction value and a pixel value of one neighboring pixel adjacent to the second pixel and located on same row with the second pixel,*

*obtain, from the received bitstream, residual of the first pixel and residual of the second pixel included in the current block,*

*obtain a restored current block including a restored pixel value of the first pixel and a restored pixel value of the second pixel, wherein the restored pixel value of the first pixel is obtained by adding the residual of the first pixel and the second prediction value of the first pixel, and the restored pixel value of the second pixel is obtained by adding the residual of the second pixel and the second prediction value of the second pixel, and*

*output the restored current block including the restored pixel value of the first pixel and the restored pixel value of the second pixel,*

*wherein, when the neighboring pixels of the current block are located within a boundary of a current picture, the neighboring pixels of the current block located within the boundary of the current picture are determined as available.*

* * * * *